(12) United States Patent
Cannon et al.

(10) Patent No.: US 7,917,511 B2
(45) Date of Patent: Mar. 29, 2011

(54) QUERY SYSTEM USING ITERATIVE GROUPING AND NARROWING OF QUERY RESULTS

(75) Inventors: John S. Cannon, American Fork, UT (US); Shashidhar Rampally, Pleasant Grove, UT (US)

(73) Assignee: Cannon Structures, Inc., Lindon, UT (US)

(*) Notice: Subject to any disclaimer, the term of this patent is extended or adjusted under 35 U.S.C. 154(b) by 326 days.

(21) Appl. No.: 11/650,119

(22) Filed: Jan. 5, 2007

(65) Prior Publication Data
US 2007/0219964 A1 Sep. 20, 2007

Related U.S. Application Data

(60) Provisional application No. 60/784,094, filed on Mar. 20, 2006.

(51) Int. Cl.
*G06F 7/00* (2006.01)
*G06F 17/30* (2006.01)

(52) U.S. Cl. .............. 707/737; 707/805; 715/700

(58) Field of Classification Search .......... 707/3, 4, 707/101, 102, 999.003, 999.004, 999.101, 707/999.102, 737, 805; 715/700, 841
See application file for complete search history.

(56) References Cited

U.S. PATENT DOCUMENTS

| | | | |
|---|---|---|---|
| 5,201,047 A | 4/1993 | Maki et al. | |
| 5,924,090 A * | 7/1999 | Krellenstein | 707/5 |
| 5,930,474 A | 7/1999 | Dunworth et al. | |
| 6,016,488 A | 1/2000 | Bosworth et al. | |
| 6,208,985 B1 | 3/2001 | Krehel | |
| 6,411,950 B1 | 6/2002 | Moricz et al. | |
| 6,415,282 B1 * | 7/2002 | Mukherjea et al. | 707/3 |
| 6,546,405 B2 * | 4/2003 | Gupta et al. | 715/233 |
| 6,581,056 B1 | 6/2003 | Rao | |
| 6,728,752 B1 * | 4/2004 | Chen et al. | 709/203 |
| 6,833,842 B2 * | 12/2004 | Keeley | 345/637 |
| 6,920,459 B2 * | 7/2005 | Dedhia et al. | 707/102 |
| 7,152,064 B2 * | 12/2006 | Bourdoncle et al. | 707/5 |

(Continued)

FOREIGN PATENT DOCUMENTS

EP 1 372 086 A1 12/2003
(Continued)

OTHER PUBLICATIONS

International Search Report with Written Opinion from PCT/US2007/0055864 dated Jun. 19, 2008.

*Primary Examiner* — Jean M Corrielus
*Assistant Examiner* — Phong Nguyen
(74) *Attorney, Agent, or Firm* — Knobbe Martens Olson & Bear, LLP

(57) ABSTRACT

A query system comprises a search component, a grouping component, and a narrowing component. The search component is configured to apply search criteria to an input data set and to generate an output data set. The grouping component is configured to divide an input data set into multiple output data sets and to display aggregate information about the output data sets. The narrowing component is configured to receive a selection of input data sets and to generate an output data set that comprises data items belonging to the selected input data sets. The grouping component and the narrowing component may be invoked iteratively to further group or narrow output data sets generated by the search component, the grouping component, or the narrowing component.

8 Claims, 18 Drawing Sheets

U.S. PATENT DOCUMENTS

| | | | |
|---|---|---|---|
| 7,185,001 B1* | 2/2007 | Burdick et al. | 707/3 |
| 2002/0059342 A1* | 5/2002 | Gupta et al. | 707/512 |
| 2002/0091690 A1 | 7/2002 | Bailey et al. | |
| 2002/0111877 A1* | 8/2002 | Nelson | 705/26 |
| 2002/0143769 A1* | 10/2002 | Tecu et al. | 707/10 |
| 2002/0190862 A1* | 12/2002 | Berquist et al. | 340/572.1 |
| 2002/0194208 A1* | 12/2002 | Knoll et al. | 707/204 |
| 2003/0212669 A1 | 11/2003 | Dedhia et al. | |
| 2004/0143564 A1 | 7/2004 | Gross et al. | |
| 2004/0143598 A1* | 7/2004 | Drucker et al. | 707/104.1 |
| 2005/0065958 A1* | 3/2005 | Dettinger et al. | 707/102 |
| 2005/0210001 A1 | 9/2005 | Lee | |
| 2005/0216447 A1 | 9/2005 | Talib et al. | |
| 2006/0020398 A1 | 1/2006 | Vernon et al. | |
| 2006/0173824 A1* | 8/2006 | Bensky et al. | 707/3 |
| 2006/0251339 A1* | 11/2006 | Gokturk et al. | 382/305 |
| 2007/0027861 A1* | 2/2007 | Huentelman et al. | 707/5 |
| 2007/0061211 A1* | 3/2007 | Ramer et al. | 705/25 |
| 2007/0118794 A1* | 5/2007 | Hollander et al. | 715/512 |
| 2007/0162422 A1* | 7/2007 | Djabarov | 707/2 |
| 2007/0174245 A1* | 7/2007 | Folting et al. | 707/3 |

FOREIGN PATENT DOCUMENTS

WO    WO 2005/004029    1/2005

* cited by examiner

FIG. 3

| Bar Code | Dimensions | Qty | MSRP | Count |
|---|---|---|---|---|
| 39642 | 1" x 4" x 6' | 120 bf | $600 | 57 |
| 39641 | 1" x 4" x 10' | 205 bf | $1,020 | 63 |
| 39640 | 1" x 6" x 5' | 3 bf | $13 | 1 |
| 39640 | 1" x 6" x 14' | 21 bf | $116 | 3 |
| 39639 | 2" x 6" x 14' | 210 bf | $1,200 | 15 |
| TOTAL: | | 335,160 bf | $800,000 | 23,000 |

View Working Data Set

Product: Barnwood — 305

Apply Search Criteria — 340

Narrow — 335

Group — 330

300, 310, 315, 320, 325

View Grouped Data Sets

| | Apply Search Criteria | Narrow | Group |
|---|---|---|---|
| Color | Qty | MSRP | Count |
| Grays | 94,000 bf | $500,000 | 10,500 |
| Grays/Browns | 500 bf | $2,300 | 199 |
| Browns | 121,000 bf | $605,000 | 9,000 |
| Mixed | 77,000 bf | $390,000 | 6,300 |
| TOTALS: | 292,500 bf | $1,497,300 | 25,999 |

FIG. 5B

View Double-Grouped Data Sets

| Color | Length | Qty | | MSRP | Count |
|---|---|---|---|---|---|
| Browns | — | 121,000 bf | | $605,000 | 9,000 |
| | 11' | 21,000 bf | | $120,000 | 2,400 |
| | 20' | 100,000 bf | | $485,000 | 6,600 |
| Mixed | — | 77,000 bf | | $390,000 | 6,300 |
| | 13' | 120 bf | | $800 | 3 |
| | 18' | 20,000 bf | | $120,000 | 1,000 |
| TOTALS: | | 198,000 bf | | $995,000 | 15,300 |

[Apply Search Criteria] [Narrow] [Group]

FIG. 5C

QUERY SYSTEM USING ITERATIVE GROUPING AND NARROWING OF QUERY RESULTS

CROSS-REFERENCE TO RELATED APPLICATIONS

This application claims the benefit of U.S. Provisional Application No. 60/784,094, filed Mar. 20, 2006 and entitled QUERY SYSTEM USING ITERATIVE GROUPING AND NARROWING OF QUERY RESULTS, the disclosure of which is hereby incorporated by reference in its entirety into this application.

BACKGROUND

1. Field of the Invention

Embodiments of the systems and methods described herein relate to a system for querying data by iteratively grouping and narrowing query results.

2. Description of the Related Art

Query systems are commonly used to find particular data stored in one or more data repositories. In conventional query systems, a user enters a query that specifies search criteria defining data that the user seeks. The system performs a search and returns data that matches the search criteria.

Methods of entering search criteria differ depending on the type of information stored in a data repository. For example, in a database with discrete information fields, such as an electronic card catalog system, a user may enter criteria specifying the value of certain fields, such as author name, title, subject, year published, and the like, to retrieve data regarding books in a library's collection. In a data repository with more extensive textual information, such as, for example, a full-text index to web sites on the World Wide Web, it is common to allow the user to enter specific words and, optionally, Boolean operators. A full-text query system typically returns each record (or link to a web site) that includes the specific words entered by the user, as modified by the Boolean operators.

Many query systems allow a user to specify very specific search criteria to try to find the precise data that the user seeks. Nevertheless, users often have difficulty focusing their search criteria, and query systems often return, in addition to relevant data, a large amount of irrelevant or only slightly relevant data. Large data repositories with diverse data sets compound this problem. In addition, conventional query systems have not provided users enough flexibility to broaden, refine, or narrow their search criteria in order to focus on the most useful or interesting data.

SUMMARY

Embodiments of the query systems and methods described herein provide tools that allow a user to iteratively broaden, refine, or narrow their search criteria. In one embodiment, a user can iteratively invoke search operations, grouping operations, and narrowing operations. A search operation applies search criteria to a data set and returns a working data set that includes the data that matches the search criteria.

A grouping operation divides a working data set into a number of data sets by a characteristic of the data. A grouping operation preferably allows the user to choose the characteristic by which the data is to be grouped. For example, in a lumber inventory database, a user may be allowed to group information about pieces of lumber by length, width, height, or other characteristics by which lumber may be classified. Thus, if a user chooses to group lumber data by length, the grouping operation may create one group of data regarding 10 foot pieces, one group regarding 11 foot pieces, one group regarding 12 foot pieces, and so on. Preferably, after a grouping operation, the query system displays aggregate data about each group, such as, for example, data that shows the total number of pieces of lumber in each group, the total number of board feet in the group, the total suggested retail price, and the like. In one embodiment, a user may be allowed to group a data set by two or more characteristics, such as, for example, color and length.

A narrowing operation creates a subset of data that is made up of one or more selected data sets. A narrowing operation preferably allows a user to select which data sets shall form the subset. Preferably, the user chooses from among data sets that had previously been generated by a grouping operation. For example, in the context of the illustrative grouping operation set forth above, a user may choose to narrow the query to lumber pieces that have a length of either 10 feet or 11 feet. Alternatively, the user may narrow the query even further by selecting only one group instead of two, or the user may select three or more groups. In one embodiment, the user makes such selection after aggregated data about each of the groups is displayed. The display of aggregated data advantageously allows the user to see an overview of each group such that the user can make a better decision about which groups are likely to contain the data that the user seeks. For example, in the context of the illustrative lumber inventory database, a user that requires hundreds of pieces of lumber for a particular construction project may first look at groups representing many pieces of lumber and may initially ignore groups that consist of only two or three pieces. That is, if the user can immediately satisfy his lumber requirements by looking at only one group, the user may not need to consider the possibility of combining multiple groups to meet the user's requirements. On the other hand, a user that seeks a very specialized piece of lumber for a small project such as, for example, a mantelpiece, may initially view groups consisting either of many pieces or very few pieces.

Preferably, each one of the search operation, the grouping operation, and the narrowing operation can be invoked iteratively in any desired order. One purpose of these operations is to help a user find specific records. To accomplish this purpose, a user may invoke a search operation such that the system creates a working data set. The user may then invoke a grouping operation on the working data set to create multiple data sets. The user may then invoke a narrowing operation to create a subset of data that includes the one or more grouped data sets upon which the user wants to focus the query. The user may then successively invoke alternating grouping and narrowing operations to further refine the query until the user finds the sought after data.

Another purpose of the search, grouping, and narrowing operations is to help a user get a feel for the characteristics of a data set. To accomplish this purpose, a user may invoke a grouping operation to determine what groups exist and how many and what type of data falls within each group. A user may then invoke a narrowing operation to find out more specific characteristics of one or more of the groups. Upon finding out such specific characteristics, a user may back up to view the overall data set more generally, then may invoke another narrowing operation to find out more specific characteristics of another one or more groups that were not previously explored. Accordingly, the ability to iteratively invoke the search, grouping, and narrowing operations provides the user flexibility to explore the overall data set, or subsets of the data set, to the degree that the user desires.

While the above process of successively grouping and narrowing query results is typical, it is not necessary. Indeed, allowing a user to invoke any of the operations at any time advantageously provides the user a great amount of flexibility to broaden, refine, and narrow search results as the user sees fit. For example, after performing a grouping operation by length, the user may believe that the groups are not precise enough because they have no width restriction. In one embodiment, the user may address this concern by invoking another grouping operation by width. Preferably, such a grouping operation, performed immediately after a first grouping operation, causes the system to display groups divided by length and further subdivided by width.

The systems and methods described herein are illustrated primarily in the context of a lumber inventory database system. The invention, however, is not limited to these illustrated embodiments. Indeed, a skilled artisan will appreciate, in light of this disclosure, that the general methods of iteratively grouping and narrowing query results can be used with any query system for searching any data repository (or multiple repositories). For example, the systems and methods described herein can advantageously be applied to a photobase. As used herein, a photobase comprises one or more data repositories that store electronic photographs, movies, or other illustrations in association with data related to the photos. For example, in the context of a lumber inventory system, a photo or group of photos of each of a plurality of pieces of lumber in inventory may be stored along with other data about the pieces of lumber. In one embodiment, the system allows the user to invoke the search, grouping, and narrowing operations to focus a search on a limited set of photos associated with the data being searched. When the user believes that a search has been sufficiently focused, the user may select some or all of the photos for viewing, such as, for example, by selecting thumbnails of the photos.

In one embodiment, the foregoing systems and methods are employed to implement a photobase of photos stored on one or more data repositories. Such a photobase may be used by a company to advertise or illustrate products that it sells. Alternatively, a photobase may be used simply to make photos accessible to users that may want to view the photos. For example, a photobase may be used to build a gallery of photos, clip art, or other illustrations that a user may use to create publications such as flyers, brochures, newsletters, or the like.

A photobase may be stored on one computer or a small number or large number of networked computers. In one embodiment, a photobase is Internet-based and comprises an index to a large number of photos accessible at diverse web sites. In addition to Boolean searching, such a photobase allows the user to iteratively group the photos (such as, for example, by subject matter, size, color, and the like) and narrow the search on the types of photos the user wants to view. This iterative grouping and narrowing process advantageously allows a user to locate photos across diverse web sites more quickly and efficiently than if the user employed Boolean searching alone.

The embodiments of the systems and methods described herein are set forth by way of illustration. Accordingly, neither this summary section nor the detailed description section limits the invention to the specific embodiments described herein.

BRIEF DESCRIPTION OF THE DRAWINGS

FIG. 3 is a simplified screen shot that illustrates, in one embodiment, a display of information about a working data set after performance of an apply search criteria operation.

FIG. 5B is a simplified screen shot that illustrates the selection of multiple groups during performance of an embodiment of the narrowing operation.

FIG. 5C is a simplified screen shot that illustrates results, in one embodiment, of performing an embodiment of a two-level grouping operation.

DETAILED DESCRIPTION OF PREFERRED EMBODIMENTS

Figure 1:
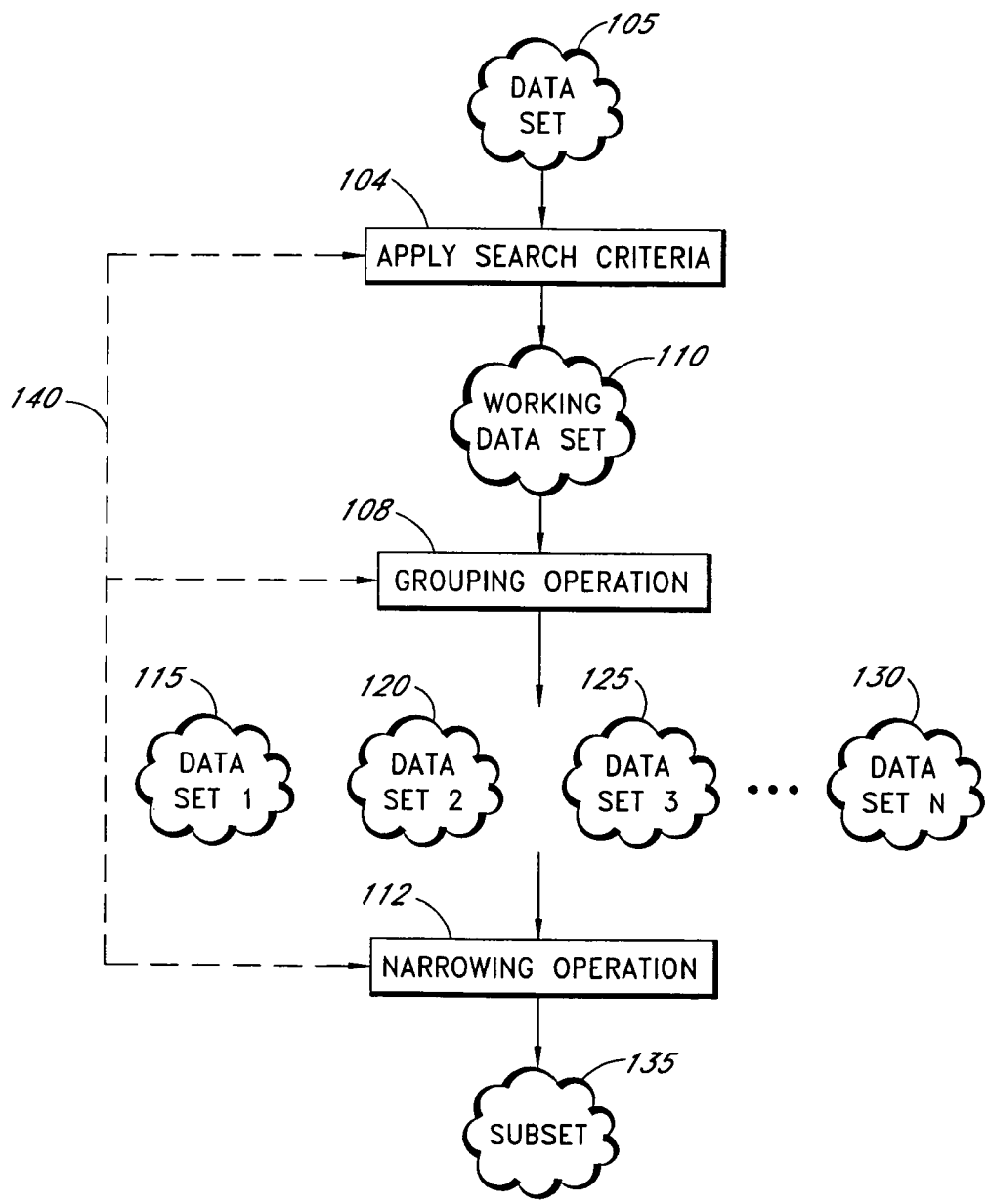
FIG. 1 is a flow diagram that illustrates application of searching, grouping, and narrowing operations in accordance with one embodiment of a query system.

Embodiments of the query systems and methods described herein provide tools that allow a user to iteratively broaden, refine, or narrow their search criteria. In one embodiment, a user can iteratively invoke search operations, grouping operations, and narrowing operations. A search operation applies search criteria to a data set and returns a working data set that includes the data that matches the search criteria. A grouping operation divides a working data set into a number of data sets by a characteristic of the data. A narrowing operation creates a subset of data that is made up of one or more selected data sets.

Preferably, in one embodiment, each one of the search operation, the grouping operation, and the narrowing operation can be invoked iteratively in any desired order. One purpose of these operations is to help a user find specific records. Another purpose of these operations is to help a user get a feel for the characteristics of a data set. The ability to iteratively invoke the operations in any desired orders provides the user great flexibility to browse through a data set or search for specific items in a data set in order to accomplish these and other advantageous purposes.

The systems and methods described herein can be used in many practical applications. In this application, we primarily describe the systems and methods in the context of two particular concrete applications, an inventory database for wood and a photobase that illustrates wood and applications for which wood can be used. We describe these concrete applications by way of illustration and not limitation. A skilled artisan will appreciate, in light of this disclosure, that the systems and methods described herein can be used for many other applications not explicitly described herein.

The systems and methods described herein are particularly useful for finding information in data sets for unique items that are not mass-manufactured. Unlike data sets for mass-manufactured items, such data sets often are not uniform, lack a standard classification system, and have substantial variation among data items. Embodiments of the systems and methods described herein provide powerful tools simply for browsing to allow the user to get a general understanding of the information available in a data set or for searching specifically for particular data items (such as the data items that a user may want to buy).

One example of a data set for unique items that are not mass-manufactured is a data set regarding characteristics of reclaimed wood. Unlike new lumber, reclaimed wood does not generally have standard specifications. Builders that use new lumber to frame houses can rely on a large supply of standard lumber pieces, such as, for example, two by fours and standard sheets of plywood. Further, standard classification systems exist for classifying the quality of new lumber. As such, many new lumber pieces are essentially commodity items that can be readily-obtained from many suppliers. In many cases a builder knows exactly what pieces of new lumber are required for a project and does not require a sophisticated tool for searching through a data set of new lumber offerings. Rather, the builder may, in many cases, request quotes from multiple suppliers for specific pieces of new lumber and choose among the various suppliers based on price, availability, service, and other factors.

Reclaimed wood, or indeed many other products that are reclaimed, recycled, or used, presents different circumstances. In general, reclaimed wood comes from preexisting structures that have been disassembled. Companies that sell reclaimed wood generally obtain such wood by disassembling (or paying someone to disassemble), wooden structures that are being retired from service. Such structures may include, for example, trestles, bridges, warehouses, barns, houses, or any other structure made of wood.

Reclaimed wood is unique in many ways when compared to new lumber. For example, reclaimed wood does not typically come in industry standard dimensions such as two by fours or standard sheets of plywood. Rather, at any given time the characteristics of available reclaimed wood depend on the wooden structures that have recently been retired from service and have been or are being disassembled. Thus, the disassembly of a large railroad trestle or bridge introduces large beams or poles into the reclaimed wood market. In contrast, the disassembly of a smaller structure such as a barn may introduce few beams and a large number of thin flat pieces used for siding, roofing, or the like. In other words, the supply of reclaimed wood on the market at any given time may vary greatly depending on the type of disassembly projects that are going on or that have recently been completed.

Reclaimed wood is also unique because it typically has been subjected to environmental factors that do not affect new lumber. Some environmental factors that affect reclaimed wood are moisture, wind, human alterations of the wood (including, for example, driving spikes or nails through the wood, applying stains or varnishes, or the like), deterioration, decay, aging, and chemicals (whether applied intentionally by humans or from exposure to natural sources of chemicals in water or the ground). These and other factors cause some pieces of reclaimed wood to have unique coloration, dimensions, or the like. Further, while reclaimed wood can be reprocessed, earlier exposure to environmental conditions may in some cases prevent cutting the wood into standard dimensions. For example, one may need to cut wood in non-standard dimensions to eliminate spikes or spike holes, spots of deterioration or decay, or certain discolored portions of wood. Alternatively, many purchasers of reclaimed wood do not remove spikes or spike holes or discolored portions or wood, but instead use such characteristics as features of the wood. The latter approach is particularly popular among people who desire to achieve a rustic look by using reclaimed wood.

In any case, whether a wood buyer chooses to remove or to feature the unique characteristics of reclaimed wood, these characteristics present a lot more variation in the characteristics of reclaimed wood than typically exists in the characteristics of new wood. As such, it is particularly advantageous in the context of reclaimed wood and other unique data sets to use the systems and methods described herein in order to browse through or search for particular aspects of the data set.

We describe the systems and methods in the context of an inventory system for lumber and in the context of a photobase for lumber. In view of the above, a skilled artisan will appreciate that the systems and methods can be particularly well-adapted for use with data sets that describe reclaimed wood products or applications of reclaimed wood. A skilled artisan will understand, however, that the invention is not limited to the reclaimed wood industry. Accordingly, we generally use the generic terms "lumber" or "wood" to emphasize that the systems and methods can be used for any type of inventory or photobase system, not just one related to reclaimed wood. Indeed, it will be appreciated by a skilled artisan, in light of this disclosure, that the systems and methods described herein can be used with data sets describing any type of information, including photos (of any subject), reclaimed wood, new wood, new or used cars, legal services, hospitals, health insurance plans, statistics of athletes, internet search results, other search results, or the like.

We now describe the systems and methods by way of example and not limitation with reference to a number of figures. Components of the systems and methods described herein are labeled with reference numbers in these figures. The first digit of each reference number corresponds to the first figure in which the reference number appears. If a component appears in more than one figure, or appears twice in a single figure, the reference number is repeated.

FIG. 1 is a flow diagram that illustrates application of searching, grouping, and narrowing operations in accordance with one embodiment of a query system. As illustrated, in one embodiment the query system performs searching 104, grouping 108, and narrowing 112 operations on a number of data sets, such as, for example, an overall data set 105, a working data set 110, grouped data sets 115, 120, 125, and 130, and a narrowed subset 135.

As used herein, the term "data set" is a general term to describe a set of data. In this application, each of the "overall data set," "working data set," "data set," and "subset" are, generically, data sets. In connection with FIG. 1, these different terms are used simply to illustrate various manners in which data sets may be manipulated and modified by various searching 104, grouping 108, and narrowing 112 operations. The use of different names does not suggest, however, that the data sets are necessarily stored in different data structures. Thus, for example, the working data set 110 results from the application of search criteria 104 to the overall data set 105. In general, the resulting working data set 110 is a subset of the overall data set 105. In circumstances in which the application of search criteria 104 does not exclude any data from the overall data set 105, however, the working data set 110 may be equivalent to the overall data set 105. Further, even when the working data set 110 is a subset of the overall data set 105, the working data set 110 may be generated by modifying the data structure of the working data set 110, such as by deleting from that data structure any records that do not meet the criteria in the apply search criteria operation 104. Alternatively, the working data set 110 may be stored in a data structure that is separate from the overall data set 105. Storing separate data structures has the advantage of allowing a user to efficiently perform an operation on the overall data set 105 even after the generation of the smaller working data set 110.

The use of various names for the data sets also does not suggest that the data sets differ structurally, although they may. In general, as described herein, the various data sets illustrated in FIG. 1 differ primarily in the underlying data that belongs to each data set. The data sets can differ structurally, but this is not necessary. For example, in one embodiment, the overall data set 105 may comprise one or more records physically stored on one or more hard disk drives, while the working data set 110 may comprise one or more records stored in a different format in RAM. Alternatively, each of the data sets can be stored in a shared format in a common medium, such that, for example, all of the data sets may be stored in RAM. A skilled artisan will appreciate, in light of this disclosure, that a data set's format may change or the data set may be moved from one medium to another without changing the underlying information stored within the data set. For example, a data set stored in Oracle format may store equivalent information to a data set stored in Progress format, even though the binary data representing the stored information may differ. For purposes of this application, a first data set is deemed to be equivalent to a second data set at least when the first data set and the second data set store the same underlying information, even if the two data sets have differences in format or in storage medium (such as switching from hard disk to RAM).

The use of various names for the data sets also does not suggest that the apply search criteria operation 104 can be performed only on the overall data set 105, or that the grouping operation 108 can be performed only on the working data set 110. Rather, in preferred embodiments, any operation can be performed on any data set. Thus, for example, after performing a grouping operation 108 and generating "data set 3" 125, the user may, in one embodiment, perform the apply search criteria operation 104 on the "data set 3" 125. FIG. 1 illustrates the ability to iteratively perform the searching 104, grouping 108, and narrowing 112 operations to any data set with a set of dotted arrows 140. Put another way, preferred embodiments allow data sets that are the output of one operation to be used as the input of another operation. Preferably, the user may be allowed to perform any number of iterations in any order. Alternatively, restrictions may be imposed on the number of iterations that may be performed or the order in which they may be performed.

Preferably, the overall data set 105 comprises the universe of data accessible to the searching 104, grouping 108, and narrowing 112 operations. That is, the overall data set 105 comprises the broadest set of data that a user can access, before any searching 104, grouping 108, or narrowing 112 operations are performed that further define and restrict the data sets being searched by the user. While it is advantageous for the overall data set 105 to include a broad group of data, this does not imply that the overall data set 105 includes all data stored on every data repository accessible to the searching 104, grouping 108, and narrowing 112 operations. Indeed, a skilled artisan will appreciate, in light of this disclosure, that it is advantageous to prevent users from accessing some types of data that may be stored on the same data repositories that house accessible data. For example, an inventory database may allow public access to information about items that are in stock and may be purchased by a user, while restricting access to confidential pricing information (such as, for example, discounts available only to certain customers). In such a case, the overall data set 105 may include the publicly accessible inventory information but not the restricted confidential information.

In one embodiment, the overall data set 105 comprises data stored in one or more data repositories accessible to the foregoing operations. As used herein, the term "data repository" is a general term that encompasses any collection of electronic data stored on any medium in any format. For example, a data repository includes, without limitation, a database stored on a hard disk of a computer. Other data repositories include electronic files, directories of files, and the like. As will be appreciated by a skilled artisan in light of this disclosure, various media for storing data include, without limitation, hard disks, floppy disks, CD-ROM discs, DVD-ROM discs, ZIP disks, JAZ disks, optical discs, magnetic tapes, flash memory, Random Access Memory ("RAM"), and the like. As will be appreciated by a skilled artisan in light of this disclosure, various formats for storing data include, without limitation, formats of commercial databases (such as Progress, Oracle, SyBase, DB2, and the like), word processing files, spreadsheet files, text files, image files, movie files, and the like.

A skilled artisan will appreciate, in light of this disclosure, that the systems and methods described herein may advantageously be implemented using one or more data structures and software modules of a relational database management system. An embodiment of the systems and methods may be implemented using the relational database management system and associated development tools commercially available from Progress Software. An embodiment of the photobase systems and methods disclosed herein may be implemented using the commercially-available MySQL application.

A skilled artisan will appreciate in light of this disclosure, however, that the systems and methods described herein may be implemented in other development environments, including other relational database management systems (Oracle, SyBase, DB2, and the like), a database system that is not a relational database management system, or any other environment such as C, C++, Java, or the like. While relational database management systems and other database management systems advantageously provide tools adapted to perform the functions set forth herein, such database management systems are not required. Rather, any type of database may be used to store the information used by the systems or methods and any type of retrieval mechanism may be used to search for and retrieve the stored information. The term "database," as used herein, is a broad term that encompasses any data repository that can be searched. Accordingly, a database can be implemented as a text file and an application configured to search the text file.

Preferably, the operations performed by the systems and methods described herein are implemented in computer software. As such, any operation, such as the grouping operation 108, that is described herein may be encoded into computer-readable instructions on a computer-readable medium (such as a CD-ROM disc). Alternatively, the instructions may be transmitted over a computer network, such as, for example, the Internet, and installed onto a user's hard disk drive or other storage medium at the user's location. The instructions may be executed on a general purpose computer, such that, upon execution, the general purpose computer performs the operations defined by the instructions.

The term "module," as used herein, refers to a group of one or more computer-executable instructions that collectively define an operation or function to be performed by a computer. A skilled artisan will appreciate, in light of this disclosure, that computer-executable instructions can be organized using organizational structures such as procedures, routines, subroutines, functions, methods (of objects), and the like. A skilled artisan will appreciate, in light of this disclosure, that the term "module" includes but is broader than each of these organizational structures. A module may be implemented as a single function stored as a separate computer file. A module may also, however, be distributed across multiple functions, subroutines, procedures, methods, and the like. Further, a single function, procedure, routine, method, or the like may encode more than one module.

While computer software embodiments are preferable and particularly advantageous, the systems and methods described herein can also be implemented in hardware, firmware, or any combination of software, hardware, and firmware. In a completely hardware implementation, logic gates and circuitry configured to perform particular operations are substituted for computer-executable instructions that define the particular operations to be performed when executed by a general purpose computer. While the systems and methods described herein are described primarily in relation to software implementations, a skilled artisan will appreciate, in light of this disclosure, how to make and use equivalent hardware, firmware, or combination implementations. The term "component," as used herein, encompasses but is broader than "module." In addition to a module, the term "component" also encompasses equivalents to a module that are implemented in hardware, firmware, or some combination of software, hardware, and firmware.

A process of searching, grouping, and narrowing a data set in order to find desired information is now described in the abstract with reference to FIG. 1. In one embodiment, a process begins with an overall data set 105. As indicated above, the overall data set 105 includes the universe of data accessible to the user using the systems and methods described herein. In one embodiment, the system allows the user to perform an apply search criteria operation 104 on the overall data set 105. In the apply search criteria operation 104, the user provides one or more criteria of data that the user is searching for. For example, if the overall data set 105 comprises information about lumber inventory, the user may specify criteria about lumber that the user is searching for and may be interested in buying. In this example, the user may specify that he is looking for pieces of lumber that are at least 12 feet long and whose species is "Douglas Fir." The apply search criteria operation 104 applies this criteria and generates a working data set 110, in which the data items meet the at least 12 feet long and "Douglas Fir" species criteria.

In one embodiment, the user enters the criteria to be applied in the apply search criteria operation 104 by entering information into one or more electronic fields that each specify a criterion. The information may be entered into fields that prompt the user for numeric values, such as, for example, a "Length" field that allows a user to type in a numerical value representing a length in feet and inches or other units. Other fields may include radio buttons, checkboxes, pull-down selection menus, slider bars, or other known mechanisms for entering criteria.

Alternatively or additionally, the system may allow the user to enter criteria using a Boolean search. Boolean search is particularly useful for searching data repositories that have at least one field that is heavily textual in nature. For example, in a search for documents in a database that contains the full text of the documents, the user can enter a Boolean search to find documents that contain a specific phrase or combination of phrases.

A skilled artisan will appreciate, in light of this disclosure, that there are many ways for a user to enter criteria for a search. The above ways are merely illustrative examples and the invention is not limited to these specific examples. Rather, the apply search criteria operation 104 can be implemented to accept user-entered criteria in any known way or any way that becomes known to a skilled artisan.

Alternatively or additionally, the apply search criteria operation 104 can apply search criteria that is at least partially generated by an automated process. For example, the apply search criteria operation 104 may be set up to automatically create a working data set 110 that is limited to data items that have been added to a data repository within the last 2 years. Such a search criteria may implement a global policy that users must have access only to a limited set of data regardless of user input. As such, the system may restrict access to users by invoking an automated process that invokes the apply search criteria operation 104 without seeking user input. Similarly, the system may invoke an automated process that invokes the apply search criteria operation 104 and applies criteria that are selected based on an automated calculation rather than by a user. For example, in an inventory system, the system may initially display, by default, a listing of inventory items that have sold the most units in the last three days. In this example, the system may automatically restrict the working data set 110 to this group of inventory items. Alternatively or additionally, the system may generate criteria based on a combination of user input and calculation by an automated process. For example, a user may select a "Search for hot-selling items" menu option, and the system may respond by running the above calculation for determining the inventory items that have sold the most units in the last three days.

In one embodiment, the apply search criteria operation 104 is executed by default when a user first begins using the system. In such embodiments, the criteria may be a default initial search criteria that the system applies unless there is user input to alter such default criteria. Alternatively, the criteria may be default initial search criteria that the user cannot alter. Alternatively, the system may not use default initial search criteria but may prompt the user for initial search criteria. While many alternatives exist, preferred embodiments have the following attributes: (1) the system presents default initial search criteria to the user but allows the user to modify the search criteria using a straightforward user interface, (2) the default initial search criteria are generally very broad but allow users to narrow the search criteria, (3) the system supports user-specific default search criteria, such that a different search criteria may be run for a User A than is run for a User B, (4) the system provides a user-friendly and intuitive user interface for entering both simple and complex searches, (5) the system allows a user to store and reuse user-specific searches, (6) the system allows for efficient updating of search criteria based on field values, links to other records, text strings, derived values, any combination thereof, or the like, and (7) the system allows permissions-based search options, such that some search options can be made available to some users but restricted to other users.

In general, the working data set 110 is restricted to fewer data items than the overall data set 105 and is thus a proper subset of the overall data set 105. This is not the case, however, in circumstances in which the user (or an automated process) specifies broad criteria that encompasses every data item in the overall data set 105. In such circumstances, the working data set 110 and the overall data set 105 may be equivalent.

Upon generating the working data set 110, the system may display information about the working data set 110. FIG. 3 is a simplified screen shot that illustrates the display of information about the working data set 110. As illustrated in FIG.

3, the working data set 110 has been restricted to display information about "Barnwood," a type of lumber in a lumber inventory database. The illustrated screen shot provides information about 5 sets of "Barnwood" lumber. For example, the highlighted set consists of 63 pieces of lumber that each measure 1 inch by 4 inches by 10 feet, have a total of 205 board feet, and have a total Manufacturer's Suggested Retail Price of $1,020.

In this example the system displays summary information about sets with multiple pieces of lumber rather than displaying information about each individual piece of lumber. In one embodiment, the system displays information about a "bar code unit." A bar code unit comprises pieces of wood organized together in a set and represented for convenience in a single data item. In one variant of the system, such bar code units are the most basic records that cannot be divided further. In this variant, there is no information stored in the database that is specific to the individual pieces in a bar code unit. This, however, is not a requirement of the invention. In another variant, the system maintains more precise information about individual pieces of wood, such that a user could, for example, select the record with dimensions of 1 inch by 4 inches by 10 feet and view information that is specific to individual pieces. In this variant, the displayed information is "aggregated" information that applies to the sets of wood as a whole rather than specific information about the individual pieces.

As such, the system may provide either non-aggregated information (that is, records that are the most basic records and cannot be further divided) or aggregated information as appropriate to the circumstances. A skilled artisan will appreciate, in light of this disclosure, that aggregated information is generally more useful when large amounts of data are part of the working data set 110. In one embodiment, the system determines whether the working data set 110 is sufficiently small to display non-aggregated information. For example, the system may have a threshold number of data items for determining if the data set is small enough to display non-aggregated information. If the threshold were 20 records, for example, the system may display information about each individual item if the working data set 110 contained only 12 items (or any number up to 20). In one embodiment, the system allows the user to choose the threshold level. Alternatively or additionally, the system may allow the user to toggle between displaying aggregated and non-aggregated information.

Preferably, the system allows the user to select specific aggregated data for viewing in more detail. For example, as shown on FIG. 3, in an embodiment in which specific information about each piece of wood is stored, the user may select to view more detail about the highlighted aggregated data about 1 inch by 4 inches by 10 feet pieces of lumber. In one embodiment, if the user selects specific aggregated data, the system displays additional information about the selected aggregated data, such as, for example, the location of the pieces of lumber, the color of the pieces of lumber, the source of the pieces of lumber, or the like. Alternatively or additionally, if the user selects specific aggregated data, the system displays non-aggregated information about each data item that belongs to the aggregated group. The system may give the user the option of whether additional aggregated information or non-aggregated information is displayed. Alternatively or additionally, the system may determine whether additional aggregated information or non-aggregated information is displayed based on how many data items belong to selected aggregated data.

The apply search criteria operation 104 has been described, for illustration only, as receiving the overall data set 105 as input and generating the working data set 110 as output. This description is by way of illustration only and not limitation. The use of the term "overall" in overall data set 105 is meant to illustrate only one typical usage of the apply search criteria operation 104, to apply an initial set of criteria to all of the data accessible to the system.

While the above usage is typical, it is not the only usage of the apply search criteria operation 104. The apply search criteria operation 104, in one embodiment, can accept any data set as input, including data sets that are the output of other operations, such as the working data set 110, the "Data Set 1" 115, the "Data Set 2" 120, the "Data Set 3" 125, the "Data Set N" 130, and the subset 135. Advantageously, performing the apply search criteria operation 104 on a data set other than the overall data set 105 allows the user to search a data set with increased precision. For example, upon viewing the subset 135, the user may recognize that the subset 135 has some data items with characteristics that are not interesting to the user. By tailoring appropriate search criteria, the user can use the apply search criteria operation 104 with the subset 135 as input to filter out the undesirable data items and to focus on the more desirable items. In some cases, the user may be able to achieve the same results using only the grouping operation 108 and the narrowing operation 112. However, the ability to use the apply search criteria operation 104 provides greater flexibility to the user by providing another tool for focusing on specific query results.

In general, then, the apply search criteria operation 104 receives at least one input data set and a set of criteria and generates an output data set. The output data set comprises the data items that belong to the at least one input data set and that meet the set of criteria. In some embodiments, the apply search criteria operation 104 receives only one input data set. In other embodiments, the apply search criteria operation 104 can optionally receive multiple data sets. In embodiments in which the apply search criteria operation 104 receives multiple data sets, the operation 104 includes a data item in the output data set if the data item is found in at least one of the multiple data sets and the data item meets the search criteria. This may be accomplished by joining the multiple data sets into a single data set and running the single data set through the apply search criteria operation 104. Alternatively, the apply search criteria operation 104 may include a data item in the output data set if the data item is found in every one of the multiple data sets and the data item meets the search criteria. This may be accomplished by performing an intersection of the multiple data sets and running the resulting data set through the apply search criteria operation 104.

Preferably, the system also provides the grouping operation 108, which generally operates on all data belonging to the working data set 110. Thus, with respect to the example of FIG. 3, in which the working data set 110 has been limited to "Barnwood," the grouping operation 108 may be performed on data related to lumber that is "Barnwood." Alternatively or additionally, the grouping operation 108 may be performed on a selected subset of data in the working data set 110. For example, in one embodiment, the user may highlight one or more of the displayed line items and run the grouping operation 108 only on the data represented by the highlighted line items.

The grouping operation 108 allows a user or automated process to specify a classification for dividing the working data set 110 into one or more discrete groups. As shown in FIG. 1, the grouping operation 108 divides the working data set 110 into the "Data Set 1" 115, the "Data Set 2" 120, the "Data Set 3" 125, and the "Data Set N" 130. Preferably, to best support the grouping operation 108, the working data set 110 includes a plurality of classifications that may be used to classify each data item. In the example of a lumber inventory database, for example, the underlying data may include classifications such as location (where is the piece of lumber located?), cross section, height, width, length, species, and the like. As the number of classifications maintained in a data set increases, the ability to group by those classifications becomes more useful for helping a user identify the data that he is looking for. Thus, in preferred embodiments, the system includes at least 10 classifications by which data may be grouped in the grouping operation 108. Alternatively, the system may include at least 30 classifications, at least 25 classifications, at least 20 classifications, at least 15 classifications, at least 8 classifications, at least 5 classifications, or at least 3 classifications.

Preferably, the system provides a mechanism for grouping by any of the classifications for which data is stored. Alternatively, the system may initially provide a mechanism for grouping by some of the classifications. When grouping is supported for some classifications, the supported classifications are preferably those that are most useful to the user for analysis. Preferably, when the system does not initially support grouping by all possible classifications, the system provides a mechanism by which the user can add a grouping option based on an initially non-supported classification. In one embodiment, for example, the system includes a tool that allows the user to select a classification. Upon the user's selection of the classification, the tool allows the user to select a mechanism for invoking a grouping operation by that classification (such as by adding the classification to a selection menu or adding a keyboard key combination that invokes the grouping operation by the classification). The system maintains the information about the classifications by which data can be grouped and the user-programmed way of invoking specific grouping operations and performs the specific grouping operations when invoked by the user.

Classification data may be associated with a data item upon creation of the data item or may later be associated with the data item by a user or automated process. For example, when a user creates a data item and adds it to a database, the user may be prompted to provide associated data. The user may provide the associated data by checking or unchecking classifications that apply to the data item, entering textual classifications that apply to the data, or the like. In addition, one or more automated processes may be run at the time of data item creation to create associations. Example associations that may be created by an automated process are statistics such as size of a data item, creation time of a data item, modification time of a data item, and the like.

Classifications may also be associated with data items, or updated, after creation of the data item. Examples of classifications that may be associated after creation of the data item include user-provided classifications such as tags, keywords, user reviews, user ratings, or the like. One advantage of allowing user-entered tags, keywords, user reviews, user ratings, and the like is that a community of users often can make better classification decisions than can an automated process or a single user. This is particularly true for subjective classifications such as user ratings. While user-entered classifications are sometimes preferred over automated classifications, certain automated classifications are very useful, such as, for example, number of times the data item has been viewed, number of times a sale has occurred after a user views a particular data item, average number of times per day that a data item is viewed, demographics of the users that typically view a data item, and the like. Such statistical information about data items may be useful to allow a user to search, group, or narrow a data set in order to generate reports such as "most viewed items," "most purchased items," or "most viewed items by 18-24 year-old-users," or similar reports. In one embodiment, such classifications are updated periodically by automated processes.

Some classifications may be created by a user in combination with an automated process. For example, in one embodiment, an automated process may, in some circumstances, modify user ratings for a data item. For example, an automated process may detect scenarios in which one or a few users enter a large number of user ratings in an attempt to unduly influence an overall user rating for a particular data item. In such scenarios, the automated process may cause the system to disregard duplicate user ratings from the same user (or IP address) so that the overall user rating represents a fair cross-section of users.

Figure 4:
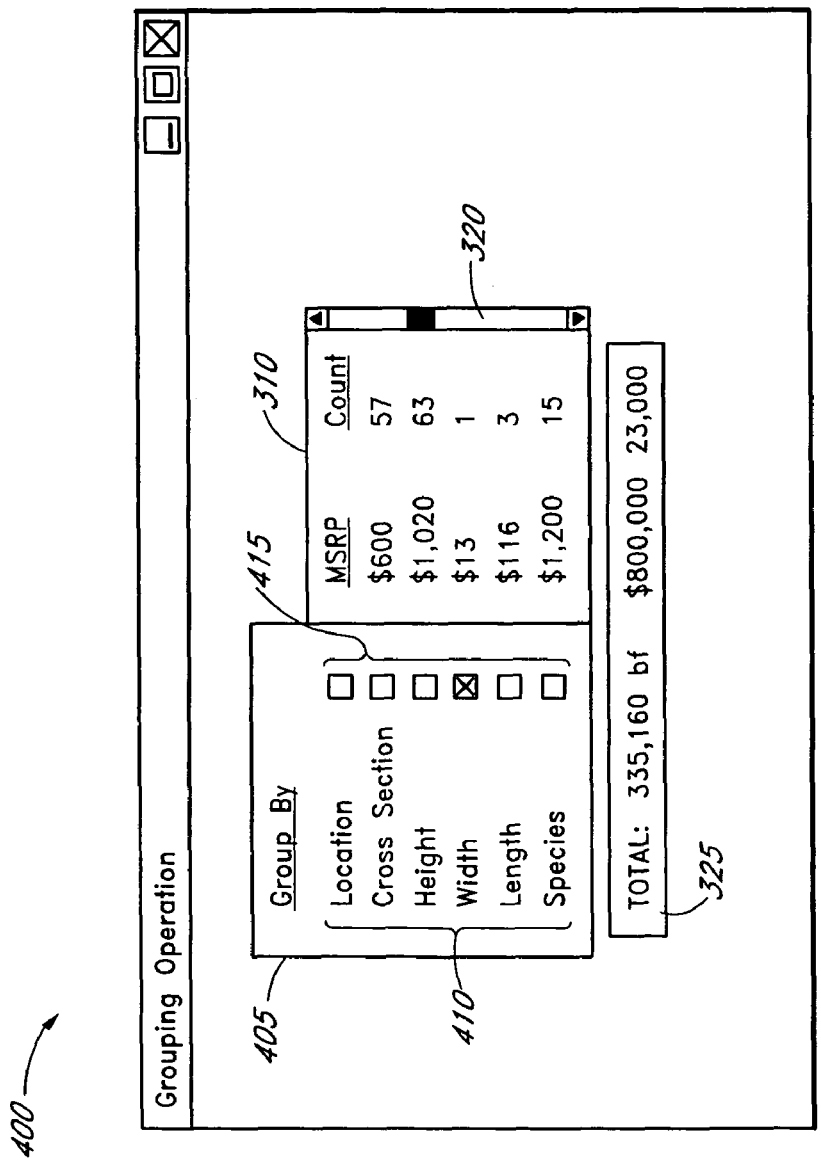
FIG. 4 is a simplified screen shot that illustrates one embodiment of a grouping menu.
Figure 5A:
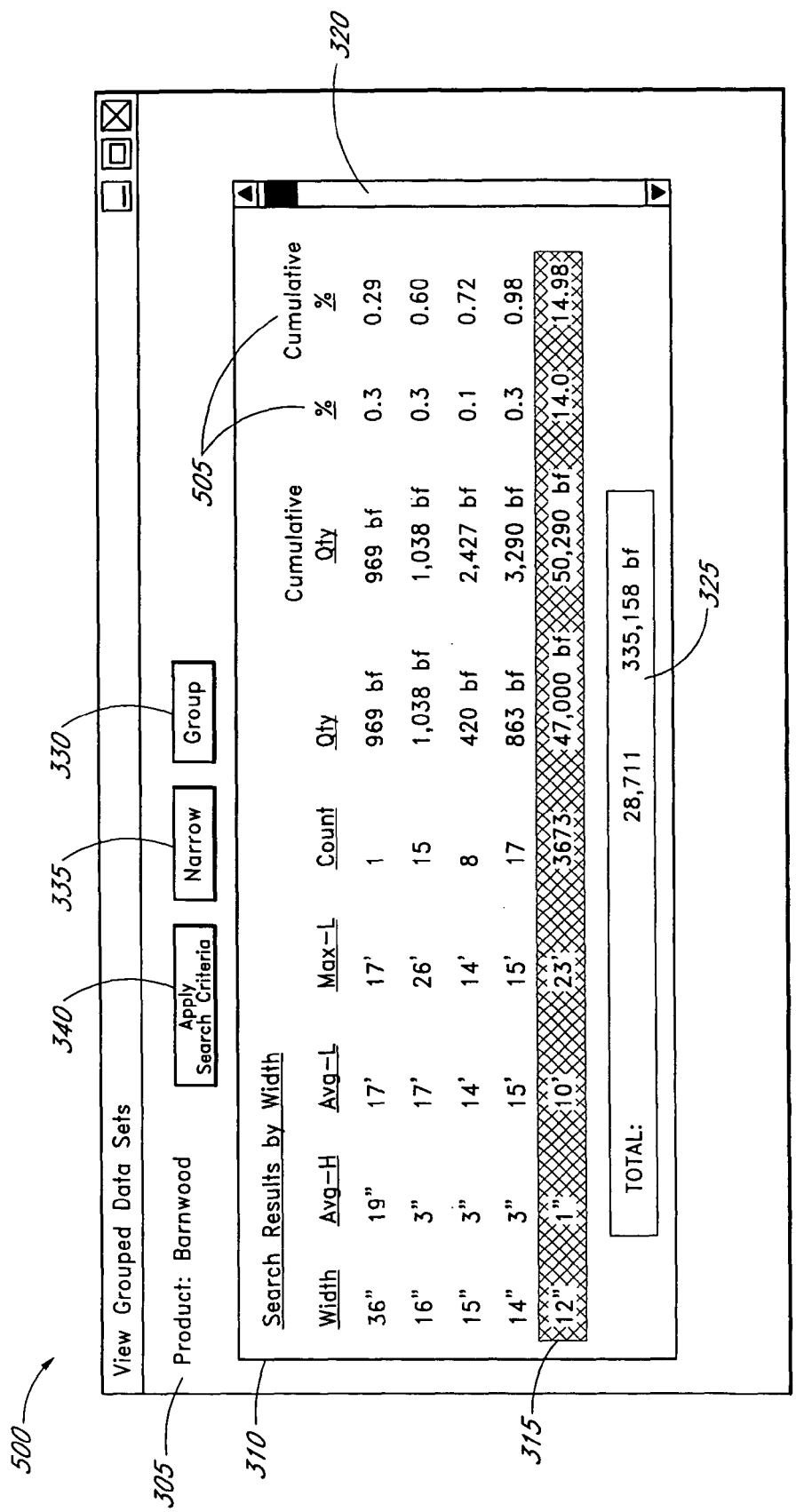
FIG. 5A is a simplified screen shot that illustrates a view grouped data sets screen that shows the result of a grouping operation.

FIG. 4 is a simplified screen shot that illustrates the selection of "Width" as a classification for grouping a data set. After receiving the selected one or more classifications upon which to group the working data set 110, the grouping operation 108 divides the working data set 110 into discrete groups based on the selected classifications. FIG. 5A is a simplified screen shot that illustrates results of the grouping operation 108 performed based on width. As illustrated, the grouping operation 108 displays aggregated information about pieces of lumber that fall within a number of discrete widths, including, as illustrated 36 inches, 16 inches, 15 inches, 14 inches, and 12 inches. Advantageously, as shown, the aggregated information also allows a user to quickly understand what proportion of the total data items fall within each group. Thus, in the illustrated example, the user can quickly determine that a very small percentage of the Barnwood has a width of 36 inches, 16 inches, 15 inches, or 14 inches. The illustration shows, however, that much more 12 inch Barnwood is available, constituting 14 percent of the total Barnwood inventory.

Preferably, each accessible data item is associated with classification information that indicates the various classifications into which each data item falls. For example, with respect to the lumber database, the system may associate each piece of lumber with a location, color, length, height, width, cross section, species, source, price, and the like. The classification information may be associated with data records by storing the classification information directly in an associated data record. Alternatively, the classification information may be associated by reference and may be stored in one or more separate records. Alternatively, some of the classification information may be associated by direct storage in a record while other classification information may be associated by reference. The invention is not limited to any particular mechanism for associating classification information with data items. Rather, the systems and methods described herein may be implemented to use any known mechanism or any mechanism that becomes known for associating classification information with data items.

Associating a significant amount of classification information with individual data items advantageously allows the system to efficiently group the data items by one or more classifications. Further, by maintaining a significant amount of classification information, embodiments of the system allow for real-time grouping of data items, generation of aggregate information of the grouped data items, and display of the grouped data items. Accordingly, the grouping operation 108, especially in embodiments in which a significant amount of classification information is associated with individual data items, provides users with an effective way to analyze a data set, break it down into its parts, and search for data.

While it is advantageous to associate classification information with individual data items, the system may, alternatively or additionally, associate classification information with groups of data items. In one embodiment, an individual data item may be associated with a group, and the group, in turn, may be associated with various classifications. In some embodiments, classification information may be associated with groups of data items or with individual data items. Other embodiments may provide only for association of classifications with individual data items. Still other embodiments may provide only for association of classifications with groups of data items. A skilled artisan will appreciate, in light of this disclosure, that an individual data item may be assigned to a group of only one data item, thus allowing the indirect association of an individual data item with classification data.

In the above illustrations the input of the grouping operation 108 is the working data set 110 and the output of the grouping operation 108 is the data sets 1, 2, 3, and N 115, 120, 125, and 130. However, the grouping operation 108 is not limited to accepting only the illustrated data set and generating the illustrated data sets. Rather, the grouping operation 108, in one embodiment, may receive any data set as input and generate a plurality of data sets as output.

In general, the grouping operation 108 receives at least one input data set and a classification and generates a plurality of output data sets. The output data sets comprise discrete data sets. The data items of the one or more input data sets are divided into the output data sets based at least in part on the classification received by the grouping operation 108. For example, if the classification is color, the output data sets may comprise a group of data items classified as blue, another group of data items classified as red, another group of data items classified as green, and so on.

In some embodiments, the grouping operation 108 receives just one input data set. In other embodiments, the grouping operation 108 can optionally receive multiple data sets. In embodiments in which the grouping operation 108 receives multiple data sets, the operation 108 combines the multiple input data sets into a single data set and then distributes the data items of the combined data set among the multiple output data sets. Combination of the multiple input data sets into a single data set may be accomplished either through a join or an intersection operation.

As set forth above, the grouping operation 108 assigns data items to the multiple output data sets in accordance with a selected classification. The grouping operation 108 assesses at least one classification value associated with each data item in order to determine the group to which the data item belongs. For example, if the classification is color, the grouping operation 108 may access a "Color" field associated with a data item, assign each "blue" data item to a blue group, assign each "green" data item to a green group, and so on. In one embodiment, a classification may take into account multiple values. For example, in one embodiment, data items may be grouped both by color and by weight. Thus, in a simple case in which items are either blue or green and either heavy or light, the system may group the data items into four groups: heavy and blue, heavy and green, light and blue, and light and green. Any number of classifications may be considered in combination, such as, for example, at least one classification, at least two classifications, at least three classifications, at least four classifications, at least five classifications, or more than five classifications.

In one embodiment, the system may allow for a classification that combines one or more data points associated with a data item into a single classification. An example is a baseball statistics database that allows classification by batting average, earned run average, or similar statistical classifications derived from multiple variables. Batting average is calculated by dividing a player's hits by his at bats. Earned run average is calculated by dividing a pitcher's earned runs by innings pitched and multiplying by 9. While such "derived" values may, in some cases, be pre-calculated and stored separately in a database, it will be appreciated by a skilled artisan that such derived values need not be stored but can be calculated if underlying values from which the derived value may be calculated are stored.

In one embodiment, the system allows a user to define a "derived" classification and to instruct the system to group by the derived classification. For example, in a lumber inventory system that stores lineal feet and price for each data item, but neither stores price per lineal foot nor natively allows classification by price per lineal foot, the system may allow the user to define the classification "price per lineal foot" and instruct the system to group data items by price per lineal foot. In such embodiments, the process of defining such derived classifications includes setting forth a formula for calculating the value of the derived classification. Thus, for example, the user could specify that price per lineal foot is calculated by dividing the price of a data item by the lineal feet of the data item.

Preferably, the system determines how many groups to create and determines precise criteria for determining which data items belong in each group. This task is straightforward for simple classifications with only a few values, such as, for example, a color classification where every data item falls into one of three colors. In such a case, the system may simply generate three groups, one for each color. In other cases, such as when each data item has a numerical value that falls within a wide range of real numbers, determining how many groups to generate is not as straightforward. For example, in a lumber inventory database in which one classification is length, a wide range of lengths may exist, from a few inches to tens or hundreds of feet.

There are several implementations for determining how many groups to generate and the precise criteria for determining the group to which each data item belongs. Depending on the preferences of an application designer or the needs of a particular organization, one of these implementations may be used, or a combination of these implementations may be used. A skilled artisan will appreciate that each approach has advantages and disadvantages and that differing circumstances may justify adopting different approaches.

In one approach, the system stores a number of predefined groups with predefined criteria for determining membership in the groups. For example, for a length classification, the system may define 5 groups: a group for all data items up to 10 feet in length, a group for all data items longer than 10 feet but shorter than 20 feet, a group for all data items longer than 20 feet but shorter than 30 feet, a group for all data items longer than 30 feet but shorter than 40 feet, and a group for all data items longer than 40 feet. This approach may work particularly well for systems in which the potential data items to be entered are well understood and can be defined ahead of time. For example, this approach may work for lumber length because consumers typically request lumber for specific uses that demand specific ranges of lumber lengths. Thus, a person may be able to predefine ranges of lengths that make sense and that will help a typical consumer to find what he is looking for.

In another approach, the system allows the user to specify the number of groups and the criteria for determining membership in the groups. This approach has the advantage of allowing the user to precisely define classifications in a way that may be most helpful to the user. It may work particularly well for applications in which groups cannot easily be grouped ahead of time. This approach relies on the user's presumed expertise regarding the type of information that the user is looking for and on the user's ability to define groups that will help the user find the right information. This approach, however, has the disadvantage that it requires more effort by the user to perform the grouping operation 108. Further, it assumes that the user has some basic knowledge of the content of a data repository being searched, an assumption that may not be true when a user is performing a basic search just to see what type of data is available.

Preferably, even if the system has a mechanism to automatically determine the number of groups and criteria to determine group membership, the system allows the user to modify the number of groups and criteria. For a particular search, a user may determine that the default number and content of groups is not very useful and may want to change it. For example, in a database of sales records, the user may group past sales information by date. The default may be to group such sales information by year. This default supports one traditional analysis of viewing annual sales to determine a company's or salesman's long-term sales success. However, for some purposes, such as focusing on more recent sales, a user may want to focus on weekly sales. Accordingly, it is preferable that the system allow the user to modify the grouping criteria such that the groups may be divided, for example, in one-week increments rather than one-year increments.

In one embodiment, the system may allow some users to group data using a particular categorization but prevents other users from using the same categorization. Such distinctions in user's ability to use various categorizations may be based on permissions or other access control mechanisms accessible to the system. Alternatively or additionally, distinctions in user's ability to use various categorizations may simply reflect different preferences set by the users themselves (or default preferences set by the system).

In general, the grouping operation 108 groups a single input data set into discrete groups. However, in some embodiments, the system is configured to handle scenarios in which one or more data items belong to multiple groups. Thus, the grouping operation 108 may include a particular data item (or multiple data items) in more than one group. Additionally, the system is configured to handle scenarios in which one or more data items are not characterized in a given classification and thus do not belong to a group. In one embodiment, the system handles such null classifications by grouping them together into an "unclassified" group. Alternatively, the system may handle a null classification by not displaying the data in any group.

As set forth above, the grouping operation 108 typically receives user input about what categorization the data items are to be grouped by. Alternatively or additionally, the system may use a default categorization. In one embodiment, default categorizations are user-specific, such that the system may use one default categorization for a first user and another default categorization for a second user. Preferably, the system allows each user to change or override his default categorization. Alternatively or additionally, the system can be configured to store information about categorizations that a user has used in the past. In such embodiments, the system can be further configured to adopt, as a default, a categorization that the user has previously used in an identical or similar scenario. In cases in which the user has previously used a variety of categorizations, the system may allow the user to select one of the previous categorizations from a menu. Preferably, the system also allows the user to save specific searches and to rerun them in the future.

Figure 6:
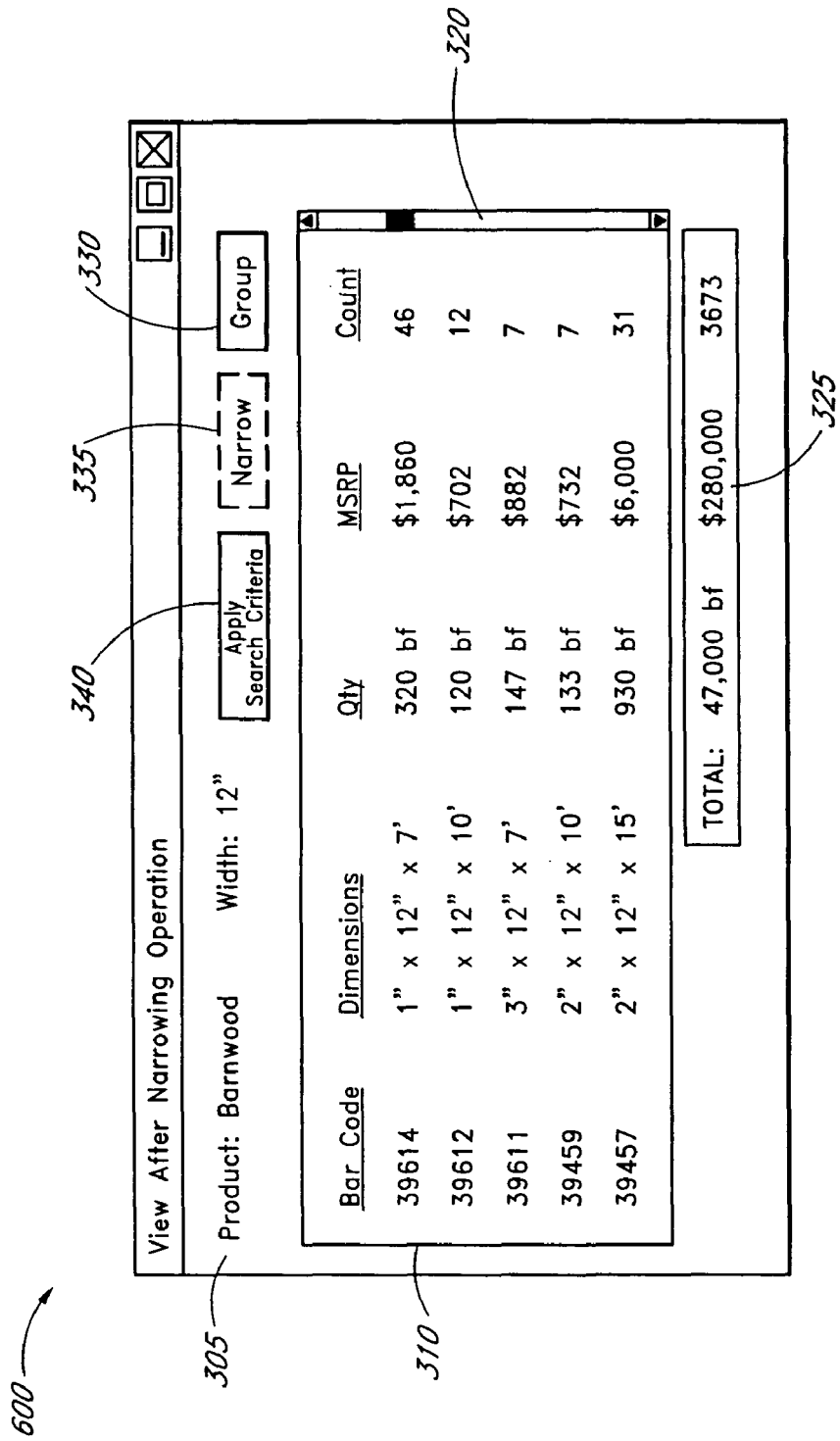
FIG. 6 is a simplified screen shot that illustrates the results of invoking an embodiment of the narrowing operation.

Preferably, the system also provides the narrowing operation 112, which generally operates on one or more of the data sets 115, 120, 125, and 130 generated by the grouping operation 108. In the narrowing operation 112, one or more of the data sets 115, 120, 125, and 130 is selected by the user or an automated process. The narrowing operation 112 then generates the subset 135, a data set that includes only the data items that belong to the selected data sets. FIG. 5A illustrates the selection (by highlighting) of a single group (the 12 inch width group). FIG. 6 illustrates the narrowed subset 135 that results upon selection of the 12 inch width group and performance of the narrowing operation 112.

As shown in FIG. 6, after the performance of the narrowing operation 112, the system displays information about the narrowed subset 135. In this example, the basic information that is displayed about the narrowed subset 135 is essentially the same information shown about the working data set 110 (illustrated in FIG. 3). However, as shown by the added notation (Width: 12") and the listed results, the narrowed subset 112 is restricted to include only Barnwood that has a width of 12 inches. As described with respect to FIG. 3, the displayed information may be non-aggregated information (in cases when the records being displayed are basic records that cannot be divided further) or may be aggregated information (when further division is possible).

In the above illustrations the input of the narrowing operation 112 is the data sets 1, 2, 3, and N 115, 120, 125, and 130. The illustrated output of the narrowing operation 112 is the subset 135. However, the narrowing operation 112 is not limited to accepting only the illustrated data sets and generating the illustrated data set. Rather, the narrowing operation 112, in one embodiment, may receive any plurality of data sets as input and generate a data set as output. For example, the user may, in one embodiment, select one or more displayed line items and apply the narrowing operation 112 to the selected line items. In such a case, the system treats each displayed line item as a separate data set and the line items serve as the plurality of data sets that are the inputs to the narrowing operation 112. In one embodiment, when the user invokes the narrowing operation 112 in this fashion, the system restricts the display of data items to only those line items selected by the user. The system may display the same information about the selected line items or the system may display different information. For example, in one embodiment, when the user selects only one or a few line items and invokes the narrowing operation 112 thereon, the system displays additional details about the data represented by the selected line items.

In general, the narrowing operation 112 receives a plurality of input data sets and an indication of selected input data sets and generates an output data set. In one embodiment, the output data set is generated by combining the data items of the selected input data sets into the output data set. For example, FIG. 5B depicts a case in which a grouping operation has grouped data items by color (Grays, Grays/Browns, Browns, Mixed) and a user has highlighted two of the four colors (Browns and Mixed). FIG. 5C depicts a simplified screen shot that reflects a narrowing operation followed by a grouping operation. As illustrated, the resulting aggregated information includes information about a combined data set made up of information about data items classified as "Browns" and data items classified as "Mixed."

Advantageously, in one embodiment, the searching 104, grouping 108, and narrowing 112 operations can be performed iteratively in any order, as directed by the user or an automated process. This provides a flexible and powerful mechanism for iteratively focusing on particular data in which the user may be interested. Further, iterative searching, grouping, and narrowing may reduce the incidence of broad queries that return too many results. While a user may initially enter broad search criteria that returns a large number of results, the system assists the user to quickly organize those results into groups and focus on the most pertinent results. This potentially allows the user to quickly disregard large amounts of data that are irrelevant to the user's search.

Preferably, each of the various data sets described herein is compatible with each of the operations 104, 108, and 112, such that any data set can be an input data set into any of the operations 104, 108, or 112. For example, the apply search criteria operation 104, in addition to being able to receive the overall data set 105 as input, may also be able to receive, for example, the working data set 110, the data set 1 115, or the subset 135 as input. Similarly, the grouping operation 108, in addition to being able to receive the working data set 110 as input, may also be able to receive, for example, the overall data set 105, the data set 3 125, or the subset 135 as input. Likewise, the narrowing operation 112, in addition to being able to receive the data set 1 115, the data set 2 120, the data set 3 125, and the data set N 130 as inputs, may also be able to receive another group of multiple data sets as input. Preferably, each of the operations 104, 108, and 112 are able to receive, as inputs, any data set that can be the output of one of the operations 104, 108, or 112. Advantageously, this ability to receive any output data set as an input into any of the operations 104, 108, or 112 facilitates the user's ability to iteratively apply the operations 104, 108, and 112 in any order of the user's choosing.

Figure 2:
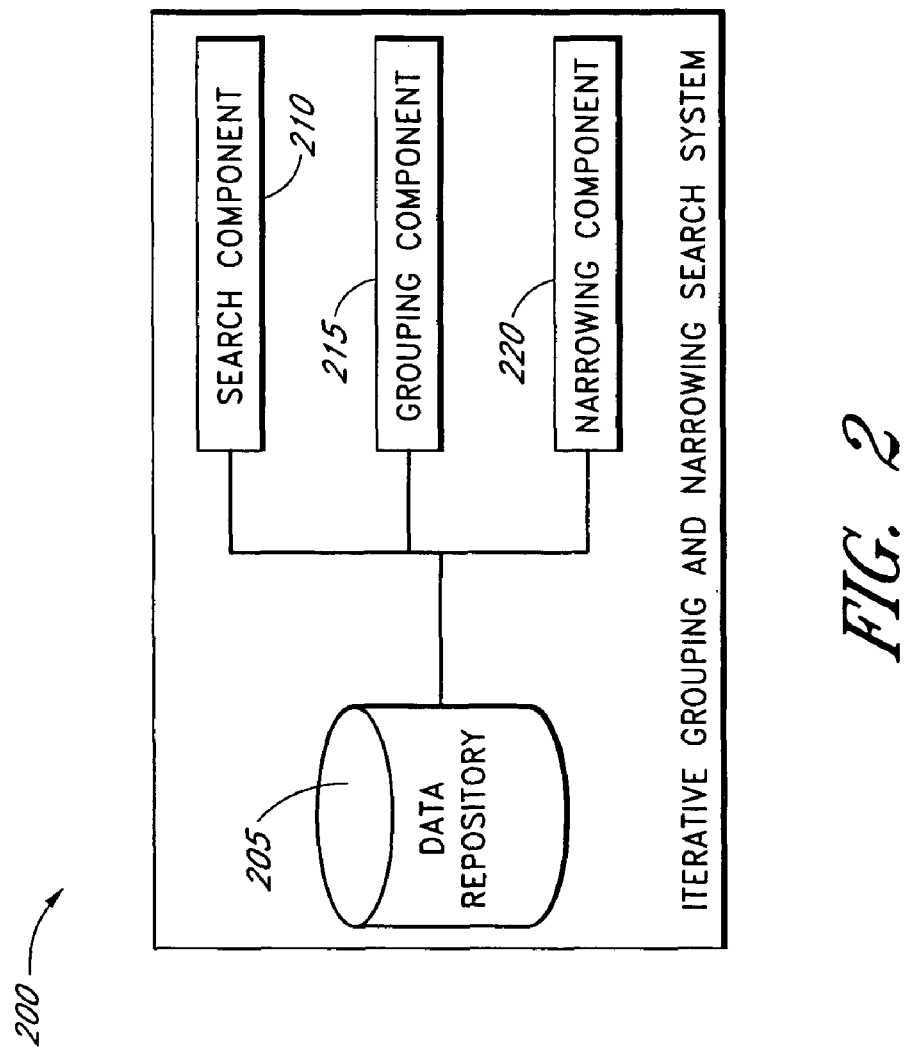
FIG. 2 is a block diagram that illustrates an iterative grouping and narrowing search system, in accordance with one embodiment.

FIG. 2 is a block diagram that illustrates an iterative grouping and narrowing search system, in accordance with one embodiment. In general, an iterative grouping and narrowing search system 200 comprises a data repository 205, a search component 210, a grouping component 215, and a narrowing component 220. The search component 210 comprises a component that is configured to perform the apply search criteria operation 104, as described above with respect to FIG. 1, or as in any variation that will be appreciated by a skilled artisan in light of this disclosure. The grouping component 215 comprises a component that is configured to perform the grouping operation 108, as described above with respect to FIG. 1, or an in any variation that will be appreciated by a skilled artisan in light of this disclosure. The narrowing component 220 comprises a component that is configured to apply the narrowing operation 112, as described above with respect to FIG. 1, or as in any variation that will be appreciated by a skilled artisan in light of this disclosure.

FIG. 2 illustrates one embodiment in which the data repository 205, the search component 210, the grouping component 215, and the narrowing component 220 are housed within a single device, such as, for example, a general purpose computer. The data repository 205 comprises a plurality of data items that are accessible to each of the search component 210, the grouping component 215, and the narrowing component 220. In one embodiment, the search component 210, the grouping component 215, and the narrowing component 220 access at least a portion of the data items in the data repository 205 and generate various data sets derived from the data items in the data repository 205, as described with respect to FIG. 1.

Many alternative embodiments exist. For example, in one embodiment, the data repository 205 is housed in a device separate from the devices or devices in which the components 210, 215, and 220 are housed and is accessible to the search component 210, the grouping component 215, and the narrowing component 220 via a communications network, such as, for example, the Internet. Alternatively, each of the data repository 205, the search component 210, the grouping component 215, and the narrowing component 220 may be housed on separate devices and connected via a communications network. Indeed, the various parts of the iterative grouping and narrowing search system 200 may be distributed across any number of separate devices in order to distribute storage and processing. For example, the search component 210 can be distributed such that portions of the search component 210 are housed in a first computer, other portions are housed in a second computer, still other portions are housed in a third computer, and so on for any number of computers. In such an embodiment, the multiple computers may cooperate with each other in order to collectively perform the functions of the search component 210. Each of the data repository 205, the search component 210, the grouping component 215, and the narrowing component 220 can be distributed across any number of devices.

FIG. 3 is a simplified screen shot that illustrates, in one embodiment, a display of information about a working data set after performance of an apply search criteria operation. As shown, a view working data set screen 300 comprises an optional criteria indication 305, a data portion 310, a selection indicator 315, an optional scrolling tool 320, an optional total display portion 325, a grouping operation selector 330, an optional narrowing operation selector 335, and an optional apply search criteria operation selector 340.

In one embodiment, the data portion 310 comprises aggregated data about data items that meet search criteria selected by a user or automated process as part of the apply search criteria operation 104. Alternatively, the data portion 310 may comprise non-aggregated data. In the illustrated example, the data portion 310 displays non-aggregated data about "Barnwood," a type of wood available for sale, as reflected in the example lumber inventory system.

In FIG. 3, the presence of the optional scrolling tool 320 indicates that there are more "Barnwood" data items than can be displayed on one screen of the data portion 310. The optional total display portion 325 also reflects the existence of more data items than can be displayed, as the data displayed on the illustrated screen do not add up to the totals shown in the total display portion 325. In the illustrated embodiment, the user may use the slider bar of the scrolling tool 320 in order to view a different set of data items. Alternatively or additionally, the scrolling tool 320 may comprise keyboard-based commands for switching between sets of data items. For example, the system may allow a user to use the down arrow and up arrow keys, or the Page Up or Page Down keys, or any other set of keys, to invoke commands that cause the system to display a different set of aggregated data items.

In one embodiment, the selection indicator 315 designates one or more of the data items for selection by a user. As illustrated, the selection indicator 315 may comprise a highlight bar. Alternatively or additionally, the selection indicator 315 may comprise one or more characters or symbols that indicate the selection of items. In one embodiment, the user may select one or more data items using the selection indicator 315 and may request additional information about the selected items. Alternatively or additionally, the system may allow the user to select one or more data items and invoke one or more of the apply search criteria 104, grouping 108, and narrowing 112 operations on only the selected group of data items. This optional operation may be implemented by generating a subset of displayed data items (including only the selected data items) and using the generated subset as an input to the operations 104, 108, or 112.

In one embodiment, the total display portion 325 provides total statistics regarding the entire data set in the data portion 310. As illustrated, not all data items that contribute to such totals are necessarily displayed on the screen at one time. That is, in the illustrated example, data items that are accessible to the user by the scrolling tool 320 but that are not displayed on the screen contribute to the displayed totals. Alternatively or additionally, the total display portion 325 may display total statistics regarding a portion of the data set, such as, for example, selected data items or data items presently displayed on the screen.

In one embodiment, the narrowing operation selector 335 provides a mechanism for the user to invoke the narrowing operation 112. In one embodiment, the narrowing operation selector 335 comprises a graphical button. Alternatively or additionally, the narrowing operation selector 335 may comprise an indication of a keystroke or keystroke combination that will invoke the narrowing operation 112. Alternatively or additionally, the narrowing operation selector 335 may not even be visible on the screen. Such a scenario may occur, for example, if a specific keystroke or keystroke combination will invoke the narrowing operation 112, but the keystroke or keystroke combination is not displayed on the screen. A skilled artisan will appreciate, in light of this disclosure, that many mechanisms for invoking an operation exist, and that any one of or combination of such mechanisms may be used to implement the narrowing operation selector 335.

Preferably, upon invocation of the narrowing operation selector 335, the narrowing component 220 begins to perform the narrowing operation 112. Preferably, the narrowing operation 112 is performed on a selected plurality of subsets of the data items that make up the present data set. As will be appreciated by a skilled artisan in light of this disclosure, the present data set is not limited to the data items displayed on screen but includes any data items that are accessible to the user by scrolling. For example, in one embodiment, the system allows the user to select a plurality of line items and to invoke the narrowing operation 112 on the data items represented by the selected plurality of line items.

The narrowing operation selector 335 is not a required component of every screen and may be omitted at times when it is not possible or desirable to allow invocation of the narrowing operation 112. In some cases it may not be possible or desirable to allow invocation of the narrowing operation 112 because the information presented may be basic records that cannot be narrowed any further. For example, in one embodiment the "bar code units" displayed on FIG. 3 may be the most basic units of information, in that the system may not store specific information about individual wood pieces. Alternatively, however, the system may store specific information about individual wood pieces, such that the "bar code units" are not the most basic units of information. It is preferable to prevent the user from invoking the narrowing operation 112 in cases where further narrowing is not possible and to allow the user to invoke the narrowing operation 112 in cases where further narrowing is possible.

In one embodiment, the apply search criteria selector 340 provides a mechanism for the user to invoke the apply search criteria operation 104. In one embodiment, the apply search criteria selector 340 comprises a graphical button. Alternatively or additionally, the apply search criteria selector 340 may comprise an indication of a keystroke or keystroke combination that will invoke the apply search criteria operation 104. Alternatively or additionally, the apply search criteria selector 340 may not even be visible on the screen. Such a scenario may occur, for example, if a specific keystroke or keystroke combination will invoke the apply search criteria operation 104, but the keystroke or keystroke combination is not displayed on the screen. A skilled artisan will appreciate, in light of this disclosure, that many mechanisms for invoking an operation exist, and that any one of or combination of such mechanisms may be used to implement the apply search criteria selector 340.

Preferably, upon invocation of the apply search criteria selector 340, the search component 210 begins to perform the apply search criteria operation 104. Preferably, the apply search criteria operation 104 is performed by allowing the user to enter criteria to be applied to the data items that make up the present data set. As will be appreciated by a skilled artisan in light of this disclosure, the present data set is not limited to the data items displayed on screen but includes any data items that are accessible to the user by scrolling. Alternatively or additionally, the system may allow the user to select one or more line items and invoke apply search criteria operation 104 on only the data items represented by the selected line items.

In one embodiment, the grouping operation selector 330 provides a mechanism for the user to invoke the grouping operation 108. In one embodiment, the grouping operation selector 330 comprises a graphical button. Alternatively or additionally, the grouping operation selector 330 may comprise an indication of a keystroke or keystroke combination that will invoke the grouping operation 108. Alternatively or additionally, the grouping operation selector 330 may not even be visible on the screen. Such a scenario may occur, for example, if a specific keystroke or keystroke combination will invoke the grouping operation 108, but the keystroke or keystroke combination is not displayed on the screen. A skilled artisan will appreciate, in light of this disclosure, that many mechanisms for invoking an operation exist, and that any one of or combination of such mechanisms may be used to implement the grouping operation selector 330.

Preferably, upon invocation of the grouping operation selector 330, the grouping component 215 begins to perform the grouping operation 108. Preferably, the grouping operation 108 is performed on all data items that make up the present data set. As will be appreciated by a skilled artisan in light of this disclosure, the present data set is not limited to the data items displayed on screen but includes any data items that are accessible to the user by scrolling. Alternatively or additionally, the grouping operation 108 can be performed on a subset of the present data set. For example, in one embodiment, the system allows the user to select a plurality of line items and to invoke the grouping operation 108 on only the data items represented by the selected line items.

In one embodiment, the performance of the grouping operation 108 begins with the display of a menu, such as that illustrated in FIG. 4. FIG. 4 is a simplified screen shot that illustrates one embodiment of a grouping menu. A grouping menu screen 400 comprises at least a grouping menu 405. Additionally, but optionally, the grouping menu screen 400 may comprise portions of the view working data set screen 300, as previously described. For example, the grouping menu screen 400 may comprise the data portion 310, the scrolling tool 320, and the total display portion 325. The grouping menu 405 may hide portions of the screen.

Preferably, the grouping menu 405 comprises a plurality of categorizations 410 and a plurality of selectors 415. In one embodiment, the categorizations 410 represent categorizations by which the data items upon which the grouping operation 108 may be categorized. Preferably, the categorizations 410 are categorizations that divide the data items into discrete groups. For example, for a lumber inventory database, the "Width" categorization divides data items into, discrete groups according to each data item's width. Lumber pieces that are 6 inches wide can be divided from those that are 12 inches wide and so on. In one embodiment, the selectors 415 provide a mechanism for the user to select one or more of the categorizations by which to group the data items. In one embodiment, the selectors 415 comprise checkboxes, as shown. Alternatively or additionally, the selectors may comprise radio buttons, characters or symbols, highlight bars, and the like.

FIG. 4 illustrates a scenario in which a user selects the "Width" categorization for a grouping operation. FIG. 5A is a simplified screen shot that illustrates a view grouped data sets screen that shows the result of such a grouping operation. As shown, one advantageous characteristic of the view grouped data sets screen 500 is that the screen 500 displays aggregated information about a plurality of data sets. Preferably, each data set comprises data items that fall into one of several discrete groups, classified by a classification chosen by the user (or an automated process). As illustrated in FIG. 5A, the discrete groups are classified by width. Preferably, the system determines how many groups to create and determines precise criteria for determining which data items belong in each group in a manner set forth above or any other manner understood by a skilled artisan in light of this disclosure. Alternatively or additionally, the user may participate in determining how many groups to create and the criteria for determining membership.

In one embodiment, a view grouped data sets screen 500 comprises elements similar to those of the view working data set screen 300. For example, in the illustrated embodiment, the view grouped data sets screen 500 comprises a criteria indication 305, a data portion 310, a selection indicator 315, a scrolling tool 320, a total display portion 325, a grouping operation selector 330, a narrowing operation selector 335, and an apply search criteria operation selector 340.

The foregoing elements have the characteristics and functions described above with respect to FIG. 3. Advantageously, in the illustrated example, the apply search criteria operation selector 340, grouping operation selector 330, and narrowing operation selector 335 make the apply search criteria operation 104, the grouping operation 108, and the narrowing operation 112 available to the user on this screen 500. Accordingly, the user can invoke the apply search criteria operation 104, the grouping operation 108, and the narrowing operation 112 on the data sets that are outputs of the grouping operation 108. The user may invoke such operations either on the entire set of data items in the data portion 310 (whether or not displayed on the current screen) or on a selected subset that includes one or more data line items.

Preferably, as shown in the example of FIG. 5A, the view grouped data sets screen 500 also comprises proportion information 505 that may help the user understand how specific data items fit in the context of the present data set. For example, FIG. 5A shows a raw amount of each width of lumber that is available in inventory. The proportion information 505 shows the percentage of the total "Barnwood" that each width makes up. Additionally (or alternatively), the proportion information 505 shows the cumulative percentage of the total "Barnwood" that a group of widths make up. In one embodiment, as illustrated, the cumulative percentage is a running statistic that takes into account the line item in which the cumulative percentage is displayed and the line items above that line item (some of which may not be displayed on the present page). As will be appreciated by a skilled artisan in light of this disclosure, the order of the line items affects each cumulative percentage in this embodiment. For example, if the 36 inch width line item were ordered last instead of first, the cumulative percentage for this line item would be 100%.

In alternative embodiments, the cumulative percentage can be calculated on any subset of line items. For example, in one embodiment the system allows the user to select any plurality of line items and the system can display the cumulative percentage for the selected line items.

The proportion information 505 can be useful to the user to understand which types of items predominate in the present data set. Such information is particularly helpful to help the user understand, and to illustrate, when a particular type of data item, or just a few data items, make up a large majority of the present data set. For example, if the user sorts the present data set by board footage, from greatest number of board feet to smallest, the user may discover that a relatively small number of classifications by width make up the vast majority of the board footage. This would occur, in one scenario, if the 12" width made up 40% of the board footage, the 18" width made up 30% of the board footage, and the 6" width made up another 25% of the board footage. By sorting the data items by descending board footage, a user searching for a very large volume of lumber may quickly determine that only the 12", 18", and 6" pieces of lumber have enough volume to meet the user's requirements. Accordingly, in such a case, a quick scan of the proportion information 505 prevents the user from wasting time looking through many line items regarding widths that cannot meet the user's volume requirements.

As will be appreciated by a skilled artisan in light of this disclosure, the percentages and other statistics that may be part of the proportion information 505 depend on what group of data is considered to constitute "all" of the data for purposes of calculating the percentage or other statistics. For example, an indication that certain pieces of lumber make up 35% of a group of wood may mean that the pieces make up 35% of all of the wood in inventory (of whatever classification), 35% of all of the "Barnwood," 35% of all of the pieces that are 12 inches in width, and so on. In one embodiment, the working data set 110 is considered to be the data set that constitutes "all" of the data. Alternatively, narrower data sets may constitute "all" of the data after grouping and narrowing operations are performed. Thus, for example, after a narrowing operation in which only 12 inch width wood is selected, an indication that a remaining group of wood constitutes 35% of the wood may indicate that that group makes up 35% of the 12 inch width wood. While the universe of data may be defined in different ways for purposes of calculating the proportion information 505, and the universe may even change as the user performs different operations, a skilled artisan will appreciate, in light of this disclosure, that it is preferable that the system provides a clear indication to the user regarding what constitutes the universe of data.

In one embodiment, proportion information may be provided at multiple levels. Thus, if a user narrows a barnwood data set to 12" wide barnwood, then 12" wide and 10' long barnwood, then 12" wide and 10' long gray barnwood, the system may be configured to show that the final narrowed data set represents 35% of the 12" wide and 10' long barnwood, 20% of the 12" wide barnwood, and 8% of the barnwood.

The ability to invoke the apply search criteria operation 104 from the view grouped data sets screen 500 assists the user to focus on only those line items that are useful to the user. For example, a high-volume buyer may suspect, from the example screen shot of FIG. 5A, that many line items have only a small proportion of the total lumber inventory (such as 0.3%, 0.1%, and the like). To avoid looking at all such small-volume line items, the user may invoke the apply search criteria operation 104 and enter search criteria such as "return only line items in which the % is greater than 5%." A skilled artisan will appreciate, in light of this disclosure, that any suitable mechanism for expressing such criteria may be used, such as, for example, Boolean operators or fill-in forms. Advantageously, in one embodiment, the apply search criteria operation 104 has the ability to treat each line item in the present data set as a record to which the criteria may be applied. Thus, the 16 inch line item may be treated as a single record having a "%" value of 0.3, rather than being treated as 15 separate data items. Accordingly, this embodiment advantageously allows the user to apply criteria based on the information displayed rather than the underlying information that is not fully displayed. Alternatively or additionally, the apply search criteria operation 104 applies the specified criteria to the underlying data.

The user may also use the grouping operation selector 330 to invoke the grouping operation 108 from the view grouped data sets screen 500. In one embodiment, the invocation of the grouping operation 108 immediately following a previous invocation of the grouping operation 108 causes the system to disregard the previous grouping and allow the user to group the data items according to a different categorization. Alternatively, such a repeated invocation causes the system to generate subgroups within the previously generated groups. FIGS. 5B and 5C illustrate an example in which several data items are grouped in two levels, first according to color and second according to length. In FIG. 5B, the screen illustrates a grouping according to color. In FIG. 5B, the user has invoked the narrowing operation 112 and is selecting the "Browns" and "Mixed" colors. In FIG. 5C, the user has further grouped the data by length, and the screen displays overall data about the Browns followed by more precise data about the Browns broken down by length and then overall data about the Mixed followed by more precise data about the Mixed broken down by length.

Continued invocation of the grouping operation 108 may cause the system to create even more levels of subgroups. In one embodiment, the system does not limit the number of levels of subgroups. Alternatively, the system may allow at least 10 subgroup levels, at least 8 subgroup levels, at least 6 subgroup levels, at least 4 subgroup levels, or at least 2 subgroup levels.

A skilled artisan will appreciate that, under some circumstances, creating multiple levels of subgroups may confuse rather than assist the user. For example, if a user creates too many subgroup levels, the user may have difficulty navigating and understanding the information contained therein. It is nevertheless an advantage of some embodiments to not restrict, or to impose only limited restrictions, on the ability of the user to create multiple subgroup levels. Allowing the user to create multiple levels of subgroups advantageously lets the user visually break down data into finer and finer classifications. For example, referring to FIG. 5C, the two-level subgroup (by color and then by length) allows the user to see both the overall composition of the lumber classified as "Browns" and also a more precise breakdown of the "Browns" by length. An additional level subgroup would allow the user to see an even more precise breakdown of the 11 foot Browns by width (or any other chosen categorization). Thus, the user can "drill-down" to view data at any desired precision. For example, multiple subgroup levels may quickly reveal to a user that there are 9,000 Browns in inventory, 2,400 Browns that are 11 feet long, 1,200 Browns that are 11 feet long and 12 inches wide, and 600 Browns that are 11 feet long, 12 inches wide, and 1 inch thick.

As illustrated in FIG. 5A, the selection indicator 315 shows that the 12 inch width has been selected. With the 12 inch width selected, the user may invoke the narrowing operation 335 in order to focus further searching exclusively on the data items related to 12 inch pieces of Barnwood. FIG. 6 is a simplified screen shot that illustrates the results of invoking the narrowing operation 335. As shown, one advantageous characteristic of the resulting view after narrowing operation screen 600 is that the screen 600 displays information that has been more precisely restricted to the 12 inch width group. Thus, as illustrated on FIG. 6, the present data set comprises Barnwood that has a width of 12 inches. Another advantageous characteristic is that the present data set has now been restricted so that the line items identify fully-dimensioned pieces of lumber that are available. It is at this level of detail that a user typically, but not always, may make a decision about what items, if any, to buy. Advantageously, the user is able to reach this level of detail by systematic and iterative application of the apply search criteria 104, grouping 108, and narrowing 112 operations.

The view after narrowing operation screen 600 may present information in sufficient detail for many users, not enough detail for other users, and too much detail for other users. Accordingly, the screen 600 preferably includes the apply search criteria operation selector 340, the narrowing operation selector 335, and the grouping operation selector 330 so that the user may invoke any of the apply search criteria 104, grouping 108, or narrowing 112 operations. In preferred embodiments, the system advantageously makes no assumptions about how much detail is sufficient for the user, and instead allows the user to iteratively invoke the apply search criteria 104, grouping 108, or narrowing 112 operations as much as is necessary to find what the user is looking for. For example, if it is necessary, the user could focus solely on the 46 pieces Barnwood that are 1 inch thick, 12 inches wide, and 7 feet long. Depending on how much data is stored about these pieces of lumber, the system may present more detailed information about these pieces, such as, for example, their color, their grade, their individual sales price, and the like. Again depending on how much data is stored, the system may allow the user to drill down and view detailed information about an individual piece of lumber, including, for example, to view a digital photograph of each individual piece of lumber. Alternatively, in embodiments in which a bar code unit is the most basic information stored (and cannot be divided further), the system may not allow drilling down any further.

In one embodiment, a view after narrowing operation screen 600 comprises other elements similar to those of the view working data set screen 300. For example, the screen 600 may comprise a criteria indication 305, a data portion 310, a selection indicator 315 (not shown), a scrolling tool 320, a total display portion 325, a grouping operation selector 330, a narrowing operation selector 335, and an apply search criteria operation selector 340. The foregoing elements have the characteristics and functions described above with respect to FIG. 3.

Figure 7:
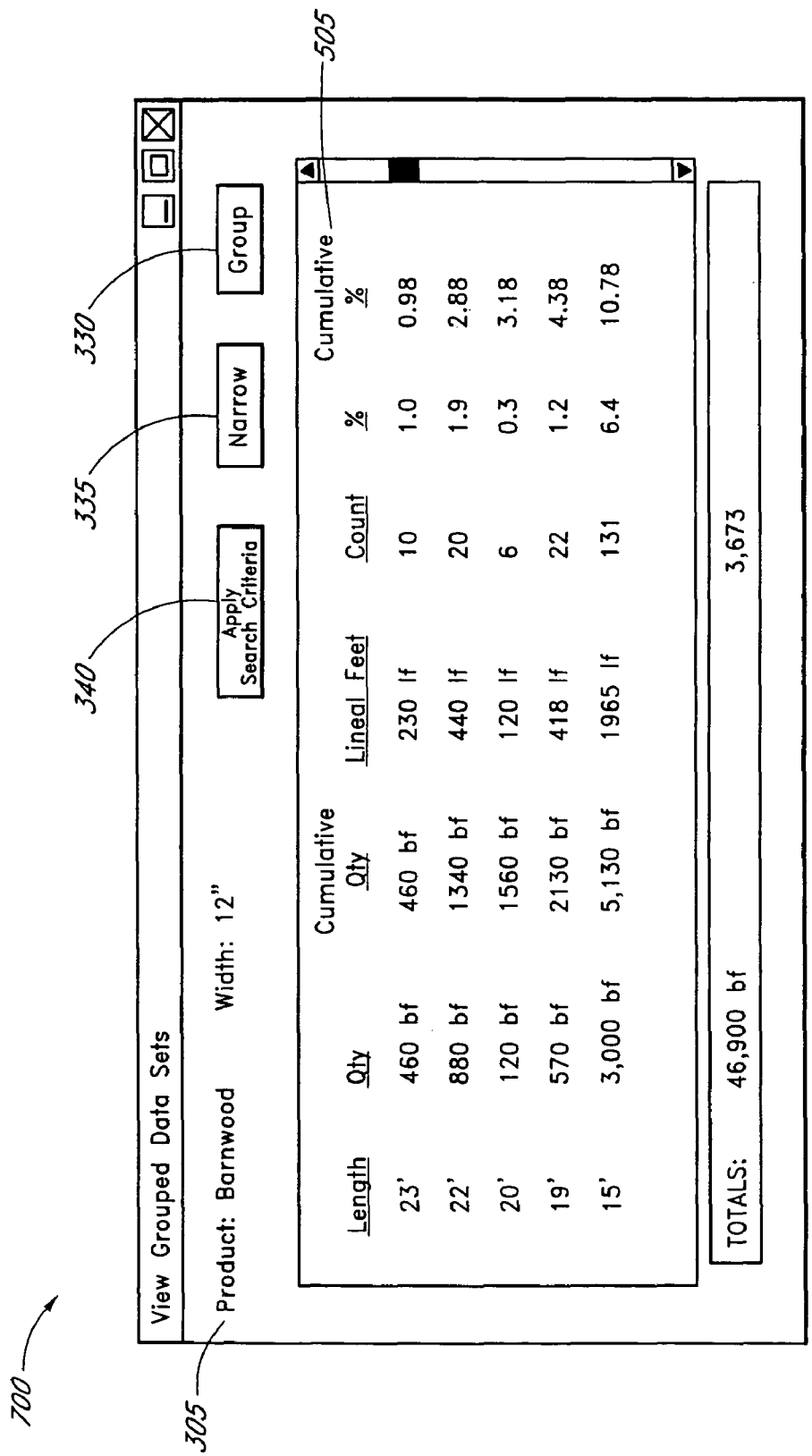
FIG. 7 is a simplified screen shot that that illustrates a resulting view grouped data sets screen after invocation of an embodiment of the grouping operation and selection of a length categorization.

As set forth above, one advantage of preferred embodiments is that the user may invoke the apply search criteria 104, the grouping 108, and the narrowing 112 operations iteratively, in any order. FIG. 7 is a simplified screen shot that that illustrates a resulting view grouped data sets screen after invocation of the grouping operation 108 and selection of the length categorization. As shown by the criteria indication 305, in the example the grouping operation 108 was invoked after the data set had been restricted to Barnwood and 12 inch width. As illustrated, the screen 700 shows additional detail, such as, for example, the inclusion of "lineal feet." Also, the screen 700 comprises proportion information 505 as discussed with respect to FIG. 5A. Advantageously, the user may continue to use the apply search criteria operation selector 340, the grouping selector 330, and the narrowing operation selector 335 to invoke the apply search criteria operation 104, the grouping operation 108, and the narrowing operation 112, respectively.

Photobase Application

The systems and methods described herein can be used advantageously with many practical applications. As illustrated, for example, the systems and methods can be used to enhance searching in an inventory database or other database. Alternatively, the systems and methods can be used to enhance searching for websites, files in a file system, electronic publications or records that describe physical publications (such as an electronic card catalog system), or the like.

In one concrete application, embodiments of the systems and methods described herein are used to enhance searching for digital photographs stored in a photobase. It will be appreciated that the photobase application described herein is only one application of the systems and methods described herein. Any, some, or all of the embodiments described above, including the apply search criteria operation 104, the grouping operation 108, the narrowing operation 112, and anything else described herein may be used to implement a photobase application.

Figure 8A:
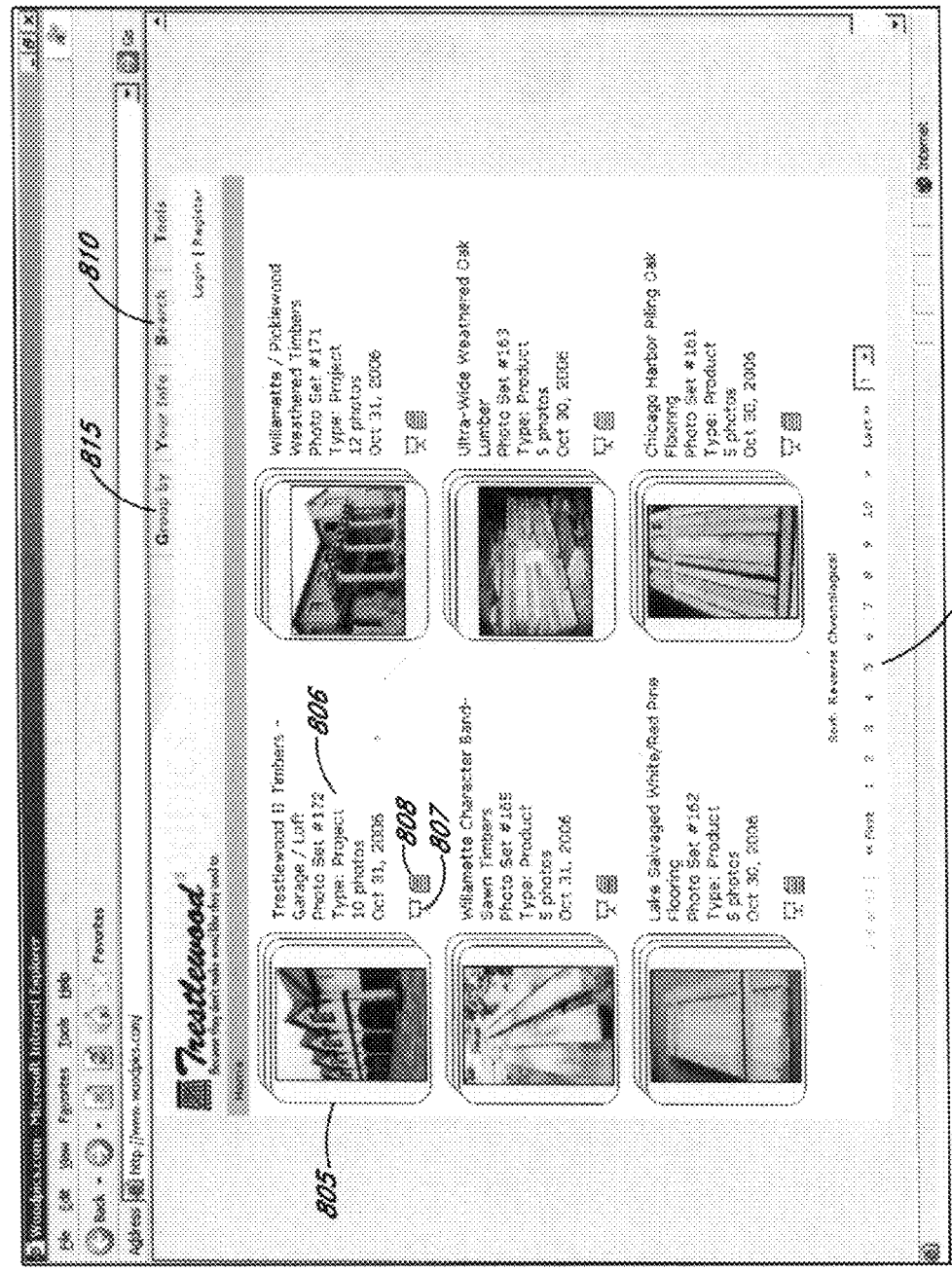
FIGS. 8A-8I are screen shots that illustrate embodiments of a photobase application.

FIGS. 8A-8I are simplified screenshots that illustrate embodiments of a photobase that implements the systems and methods described herein. As illustrated in FIG. 8A, a photobase screen 800 may present general photo information 805 about a number of photosets. In the example shown, the photobase screen 800 is displayed in a web browser. In one embodiment, the photobase screen 800 is generated by a photobase screen that is part of or in communication with a web server. In such an embodiment, the photobase screen 800 comprises one or more web pages that the web server serves to the user's web browser. However, a skilled artisan will appreciate, in light of this disclosure, that the photobase screen 800 may be implemented in many ways and does not need to be web-based.

As used herein, a "photoset" is a set of one or more photos. In general, the photos in a particular photoset have some relationship with each other, such as, for example, being taken by the same photographer, on the same day, or representing the same or a similar subject. However, it is not necessary that the photos in a photoset have a strongly defined relationship between each other. Rather, an embodiment of the photobase allows users to create photosets, such that photos of a user's choosing may be assigned to a photoset. As will be appreciated by a skilled artisan in light of this disclosure, this allows the association of photos into a photoset even if there is little or no logical relationship between the photos.

While we generally use the term "photo" herein, a photobase may store information about digital images that are not photos (such as, for example, drawings or animations). One variant of a photobase comprises a database that stores information about digital photos or other images that are stored as separate files. Alternatively or additionally, some or all of the photos may be stored in the database. A skilled artisan will appreciate that there are many ways to store digital photos and other digital objects in a database, including, for example, storing each photo as a binary large object ("BLOB"). Any suitable mechanism for storing the photos (whether within the database or as separate files or objects) may be used.

As will be understood by a skilled artisan in light of this disclosure, the amount and type of information stored for each photo or photoset differs according to the application for which the photobase is used. If the photobase is used to provide illustrations or advertisements for products that are being sold, the information preferably allows a potentially interested purchaser to search for products in enough precision to find the products that the purchaser may be interested in. Thus, for one application in which the photobase is used to illustrate reclaimed wood products, the information may identify the species of wood depicted in the photos, the ways in which the wood may be used, the dimensions of the wood, the price of the wood, the availability of the wood in inventory, the source of the wood, and the like. For another application in which the photobase is used to illustrate pieces of art, the information may identify the format of the piece of art (e.g. is it an oil painting, a sculpture, or the like), the dimensions of the piece of art, the price of the piece of art, and the artist who created the piece of art. Many other types of information may be useful to assist the user of the photobase, and the photobase preferably stores as many types of information that is as precise as possible to assist the user to search for and identify photos.

In a variant of a photobase, the information about photos also includes information about relationships between photos. For example, in one embodiment, the photobase includes photoset records that identify one or more photos that belong to a photoset. Preferably, photos that belong to a photoset are related to each other in some way. However, no discernable relationship needs to exist between photos in a photoset. Rather, in some cases, photos may simply be added to a photoset at the time the photos are taken. In such cases, the only relationship between photos in a photoset may be that the photos were taken at roughly the same time.

In other cases there may be a more significant relationship among photos in a photoset. For example, photos in one photoset may depict reclaimed wood products installed in a particular project. Photos in another photoset may be photos of a specific batch of unique wood available for sale. A skilled artisan will appreciate, in light of this disclosure, that there are many ways in which photos may be related. Advantageously, providing photoset records that identify the photos that belong to the photoset without restricting the types of photosets that may be created allows users flexibility to define photosets according to any relationship (or no relationship) that may exist between photos.

Advantageously, photosets may be used as one mechanism to relate photos to one another. However, photosets need not be the only mechanism for defining relationships among photos. In one embodiment, an individual photo or a photoset may be linked with one or more characteristics or properties using a link. As used herein, a "link" is an association between a photo or photoset and one or more characteristics or properties, indicating that the linked photo or photoset has the one or more linked characteristics or properties. Links can be represented using any suitable data structure, such as, for example, arrays, linked lists, pointers, variables, database tables, or the like. An example link may link a particular photo with a particular application (such as flooring), indicating that the photo depicts wood that may be used for flooring.

Other characteristics or properties that may be linked to a photo or photoset include: (1) other applications such as timbers, doors, siding, wainscot, or the like (2) inventory items, (3) wood sources such as Lucin Cutoff Trestle, Spiegel Catalog Warehouse, or the like, (4) wood species such as Douglas Fir, Pine, or the like, (5) inventory types such as flooring, timbers, lumber, poles, non-wood, or the like, (6) specification sheets (e.g. an identification of a specification sheet that describes the material or category of material depicted in a photo), (7) special categories such as closeout specials, special run products, or other special categories that may be defined, (8) properties such as wane, texture, or the like, (9) traits such as limited wain, rough-sawn texture, or the like, or (10) any other characteristic or property that may be associated with a photo or photoset.

As will be appreciated by a skilled artisan, the foregoing are just examples of characteristics or properties that may be linked to a photo or photoset. A skilled artisan will appreciate, in light of this disclosure, that many other characteristics or properties may be linked to a photo or photoset. For example, in a photoset of artwork, one property that may be linked to a photo may be a type of art such as painting, sculpture, or the like. In general, it is advantageous to define as many characteristics or properties that may be linked to a photo or photoset as possible, but no particular number of characteristics or properties that may be linked is required. One embodiment includes at least 9 predefined characteristics or properties that may be linked to a photo or photoset. Another embodiment includes at least 7 predefined characteristics or properties that may be linked to a photo or photoset. Another embodiment includes at least 5 predefined characteristics or properties that may be linked to a photo or photoset. Another embodiment includes at least 3 predefined characteristics or properties that may be linked to a photo or photoset. Another embodiment includes at least 1 predefined characteristic of property that may be linked to a photo or photoset. In addition to predefined characteristics or properties that may be linked to a photo or photoset, some embodiments allow a user to define additional characteristics or properties that may be linked to a photoset.

In one embodiment, a user may establish a link between a photo or photoset and any one or more of the linkable characteristics or properties. In one embodiment, the user establishes the link by selecting the characteristics or properties to be linked and selecting the photos or photosets to be linked from one or more selection tools such as pull-down menus, checkboxes, radio buttons, text input boxes, or the like. In one embodiment, the ability to establish links may be restricted to an administrator or other user with permissions to establish links.

The links we have described above are direct links in that they directly relate a photo or photoset to one or more characteristics or properties. The systems and methods may also define indirect or implied links that indirectly relate a photo or photoset to one or more characteristics or properties based on other relationships. For example, a relationship may be defined that indicates that any photo or photoset linked to a particular characteristic or property is also indirectly or implicitly linked to other characteristics or properties. One such relationship may be that any photo or photoset linked to an inventory item "Trestlewood II Circle-Sawn Timbers" is also implicitly linked to an inventory type of "timber," a species of "Trestlewood II," a source of "Lucin Cutoff Trestle" and a specification sheet of "#1101." In one embodiment, implied link relationships are encoded in one or more data structures stored in a database. A skilled artisan will appreciate, however, that implied link relationships can alternatively be represented in another suitable way. The embodiments that use implied links can search the implied link relationships to determine if any links are to be implied.

Another advantageous feature of some embodiments allows a user to associate one or more tags with a photoset or photo. As used herein, a "tag" is a text string. Advantageously, a tag may be a user's description or keyword for a particular photo or photoset. By allowing users to associate tags with photosets or photos, the systems and methods allow for user customization and categorization of the photos or photosets in a photobase. For example, a user may use tags to associate keywords with photos or photosets in a way that is meaningful to the user. In one embodiment, tags are searchable by the user that enters them and by other users as well. As such, as users associate tags with photos and photosets, the photobase gradually stores additional tagging information that may be useful for indexing or searching the photobase. Alternatively, tags may be searchable only by the user that enters them, and separate tags are maintained for each user. Alternatively, tags may be searchable by the user that enters them and other users to whom the entering user grants access.

Advantageously, embodiments of the systems and methods allow searching, grouping, and narrowing operations to be performed based on links and tags in addition to standard field information. (Standard field information includes fields such as date, owner of photoset, reviewer, location, description, photoset type, and the like.) Thus, for example, a variant of the apply search criteria operation 104 allows a user to search for photos or photosets that have a particular associated tag. As with links, in some embodiments tags can be either direct or implied tags. Implicit relationships between photos and photosets may be defined in order to allow the system to determine whether an implicit tag exists.

We have illustrated links and tags with respect to the photobase application by way of example and not limitation. Links and tags may also be used with other applications, such as, for example, the inventory database example set forth herein. In the context of an inventory database, the links and tags may be associated with particular data items, such as, for example, a bar code unit representing a unit of inventory, rather than being associated with photos or photosets. A skilled artisan will appreciate, in light of this disclosure, that links and tags can be used, but are not required, for any embodiment that is explicitly set forth herein or that is apparent to a skilled artisan in light of this disclosure.

In one embodiment, photosets provide a mechanism to store common information about all photos in a photoset. In one embodiment, some or all of the information that is stored for a photoset applies to each photo that is stored in the photoset. For example, in one embodiment, a link for a photoset is a link to every photo in that photoset, or a tag for a photoset is a tag for every photo in that photoset. As another example, in the context of a reclaimed wood database, a photoset may consist solely of photos that depict Douglas Fir pieces of wood. In such a case, information that identifies a wood species as "Douglas Fir" may be associated with the photoset rather than individually associated with each photo in the photoset. Advantageously, this allows a user to quickly enter common information about photos in a photoset without having to reenter information for each photo. While it is preferable to associate as much information as possible at the photoset level, it is not necessary. In one embodiment, information may be associated with each photo. Alternatively, some general information may be associated with a photoset while still allowing more specific information to be associated with individual photos. In one embodiment, a user may enter general information once for an entire photoset but the photobase may associate the information separately to each photo in the photoset.

Preferably, photoset records include a reference to photos stored as separate files such that the photos themselves are not stored in the photoset records, but this is not required. A reference to a photo may include a photo identification such as a number, code, filename, or the like that identifies the photo. The photo identifier may itself be sufficient to identify the photo, such as, for example, a full path name to a photo file. Alternatively, the photo identifier may be a number or code that the system looks up in a database in order to fully identify a photo.

As illustrated, general photo information 805 may include textual photo information 806 that generally describes the photos in a photoset. The textual photo information 806 advantageously allows a user to know generally what type of photos are in a photoset without specifically selecting and viewing the photo set. Based on the textual photo information 806, a user may be interested in looking at the photos in more detail and may select the photo set for viewing.

In one embodiment, the photobase screen 800 also provides a slideshow tool 807 and a detailed information tool 808. A user may invoke the slideshow tool 807 in order to view a slideshow of the photos stored in the photoset. A user may invoke the detailed information tool 808 to view additional information about the photoset. Some examples of detailed information that may be displayed when the user invokes the detailed information tool 808 are descriptive text about the photoset, location of the project, product, etc. depicted in the photoset, links to related searches, and the like. Some or all of this or other information may be restricted such that it can be viewed only by registered users, but this is not required.

In one embodiment, the photobase screen 800 also provides a search tool 810 and a grouping tool 815. More than one search tools 810 and grouping tools 815 may be provided, but multiple tools are not required. In one embodiment, multiple search or grouping options are presented when a user selects the search tool 810 or the grouping tool 815. Such multiple search or grouping options may be implemented as separate tools or as one tool that is capable of performing multiple operations. A user can use these tools to invoke the apply search criteria operation 104 or the grouping operation 108, respectively. Further, in one embodiment, the user can invoke a narrowing operation 112 by selecting one or more of the displayed photosets.

Figure 8B:
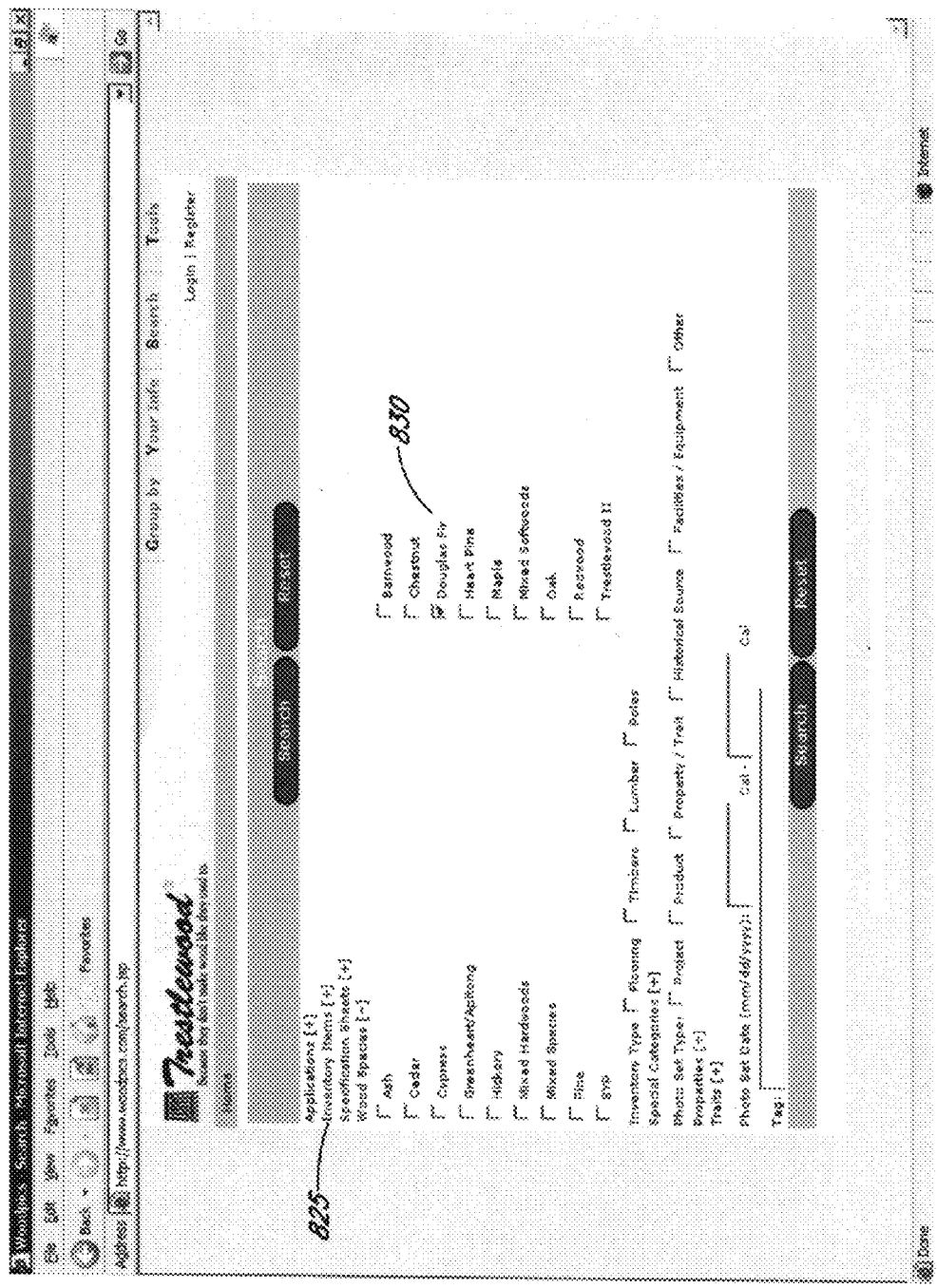

FIG. 8B depicts a photoset search screen 800 after a user has selected the search tool 810. As illustrated, in one embodiment the photoset search screen 800 provides a number of criteria 825 by which a user can search. As shown, the user has expanded the wood species criteria. Upon expanding the wood species criteria, the user is able to choose specific wood species to which the data set of photos to be searched is limited. In this example, the user has checked the Douglas Fir checkbox 830 in order to limit the data set of photos to be searched to photos that depict pieces of wood that are Douglas Fir. As will be appreciated by a skilled artisan in light of this disclosure, the photoset search application may provide for any type of searching of a data set, including full text searching for text fields, date searches for date fields, Boolean searching, or the like. The search tool 810 may incorporate any or all of the features or characteristics described above with respect to the apply search criteria operation 104 or any other feature or characteristic that is apparent to a skilled artisan in light of this disclosure.

Figure 8C:
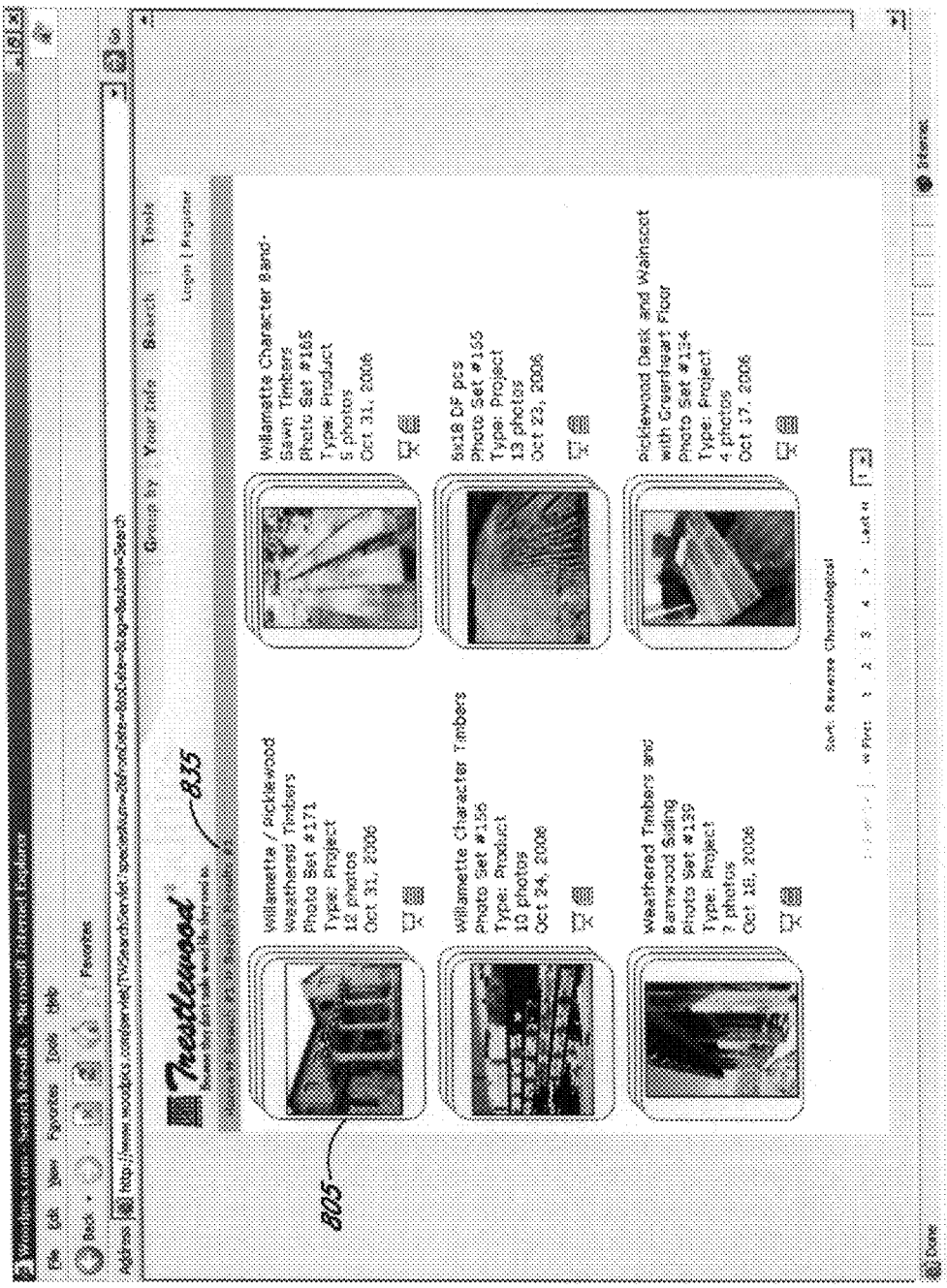

FIG. 8C is a screen shot that illustrates displayed search results. As shown, the displayed search results include general photo information 805 in essentially the same format as shown on the screen of FIG. 8A. However, the displayed search results have been limited by the search criteria provided by the user, or, in this example, to wood pieces that are Douglas Fir. As also shown, the screen of FIG. 8C (and several other figures) includes a search history 835. In one embodiment, the system keeps track of a search history that includes information about at least some of the operations performed leading up to the generation of the present data set. Preferably, the search history includes information about all of the operations performed leading up to the generation of the present data set, but, in some embodiments, an abbreviated history may be maintained for particularly long searches. Preferably, the search history keeps track of the type and order of the operations performed and the inputs to the operations. Additionally, statistical information about the operations performed (such as how many data items were returned) may also be maintained.

Preferably, the search history may be displayed on screen such that the user may understand the operations performed to arrive at the current data set. In one embodiment, the search history is displayed on each screen along with present search results. Alternatively, the search history may not be displayed on screen by default, but the user may access the search history by invoking a command. An example search history display may appear as follows:

Apply Search Criteria (Species=Douglas Fir)>Group (Applications)>Narrow (Application=Timbers/Beams)>Group (Photo Set Type)>Narrow (Photo Set Type=Projects)>Narrow (Photo Set #171)>Narrow (Photo #1228).

As shown above, the example search history indicates that seven operations were performed. In the first operation, the apply search criteria 104 operation was performed with the criteria set to return photos or photosets in which the species is Douglas Fir. In the second operation, the grouping operation 108 was performed to generate groups based on the Applications categorization. In the third operation, the narrowing operation 112 was performed to narrow the data set to photos or photosets linked to the Timbers/Beams application. In the fourth operation, the grouping operation 108 was performed to generate groups based on the Photo Set Type categorization. In one embodiment, the grouping operation 108 groups the current working data set (i.e. the data set that exists after the execution of the first, second, and third operations. In the fifth operation, the narrowing operation 112 was performed to narrow the data set to photosets that relate to projects. In the sixth operation, the narrowing operation 112 was again performed to narrow the data set to a particular photoset. In the seventh operation, the narrowing operation 112 was again performed to narrow the data set to a particular photo.

Preferably, the displayed search history provides a mechanism that allows the user to navigate to one of the displayed steps in the search history. For example, in one embodiment, each step in the search history has a hypertext link. Upon clicking the hypertext link for a step, the user could return to that step and view the data set that was generated as of that step. In one embodiment, the system caches at least a portion of previous results and can display previous results from the cache, as necessary. Alternatively or additionally, if cached results are not available, the system can regenerate the data set that was generated as of that step by rerunning each operation up to and including the selected operation. Thus, in the above example, if the user selects the Group (Applications) step, the system may rerun the Apply Search Criteria (Species=Douglas Fir) step and then rerun the Group (Applications) step. A skilled artisan will appreciate, in light of this disclosure, that other selector mechanisms besides hypertext links may be used.

In one embodiment, the system allows the user to store one or more search histories and to retrieve such histories later. Advantageously, the user can use such stored search histories to quickly regenerate a search that he has performed in the past. This feature is particularly advantageous in circumstances in which a user has previously identified a class of information that the user wants to search and wants to rerun the search to determine if new data items have been added to the system. Thus, for example, the user may manually run the Apply Search Criteria (Species=Douglas Fir)>Group (Applications)>Narrow (Application=Timber/Beams) operations as reflected in a portion of the above search history. The user can then easily save this order of operations and specific criteria. At a later time, the user can retrieve the search history and automatically run all of the steps in order to view any photos or photosets of the Douglas Fir species and with an Application of Timbers/Beams. Accordingly, the ability to save search histories provides an intuitive way for a user to construct and store complex queries. A skilled artisan will appreciate, in light of this disclosure, that the ability to save search histories is particularly useful when a user wants to create a search that the user expects to run often.

Although the search history 835 is illustrated with respect to the photobase screen 800, the search history feature can be used outside the context of the photobase application. For example, the search history feature, and the ability to save and rerun search histories, can be included in an implementation of the inventory database system or any other system that uses the systems and methods disclosed herein.

Figure 8D:
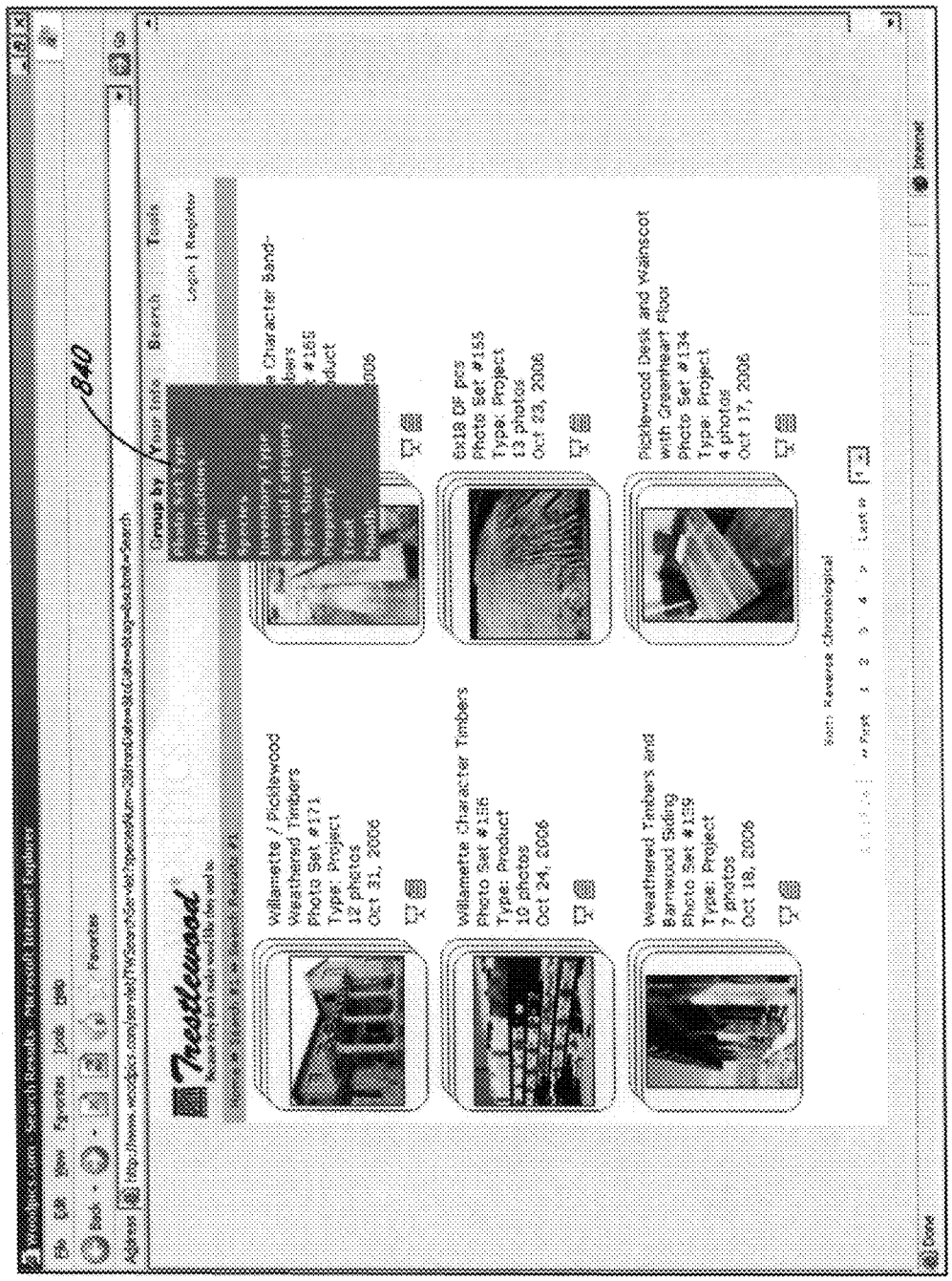

FIG. 8D illustrates a photobase screen in which a group by menu is presented. As shown, the group by menu 840 includes a number of characteristics by which the photos or the photosets in a photobase may be grouped. The group by feature implements, in the context of the photobase application, one or more of the features of the grouping operation 108 described above.

Figure 8E:
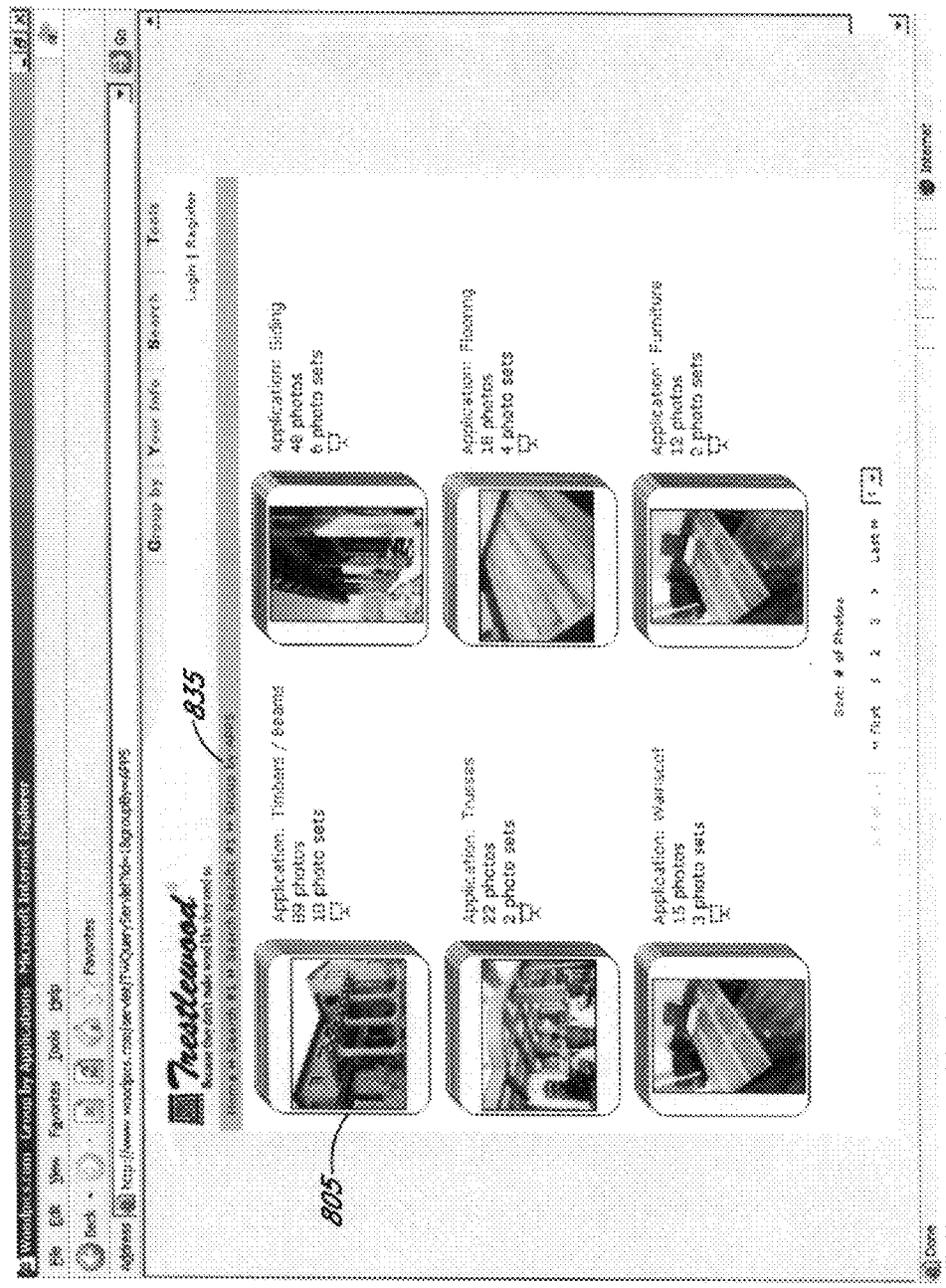

FIG. 8E illustrates a photobase screen after invocation of a grouping operation. In the illustrated example, the user has chosen to group the photos by application. In this context, application refers to the uses to which particular pieces of wood have been or may be put. For example, some of the wood is used as or is suitable for timbers or beams, while other wood is used as or is suitable for trusses, wainscot, siding, flooring, or furniture. As illustrated, the general photo information 805 shows that multiple photosets may fall under each application. For example, as shown, the Timbers/Beams application includes 10 photo sets. A user can click on one of the pictures representing an application in order to view information about each of the photosets for that application. FIG. 8E also illustrates that the search history 835 is updated to include the Group by:APPS operation.

Figure 8F:
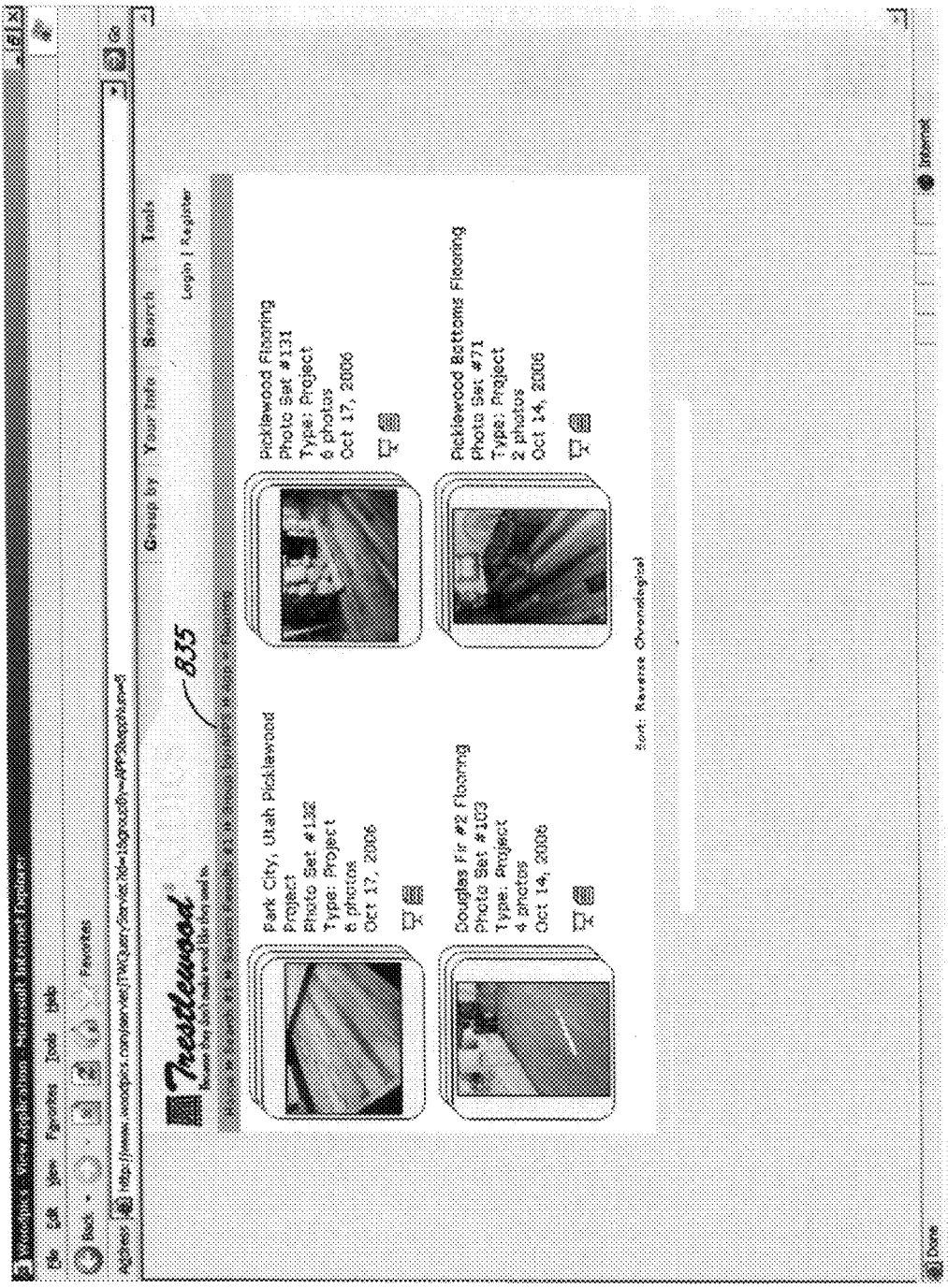

FIG. 8F illustrates a photobase screen after invocation of a narrowing operation. Specifically, in FIG. 8F the screen 800 displays information about the 4 photosets for the "Flooring" application. In one embodiment, the screen of FIG. 8F is displayed as a result of the user selecting the "Application: Flooring" group of FIG. 8E, thereby narrowing further searches to those photos or photosets related to wood that may be used for flooring. In one embodiment, the user may narrow a search by selecting a single group. Alternatively or additionally, the user may narrow a search to more than one selected group. Preferably, the photobase application implements one, some, or all of the features of the narrowing operation 112, as set forth above.

Figure 8G:
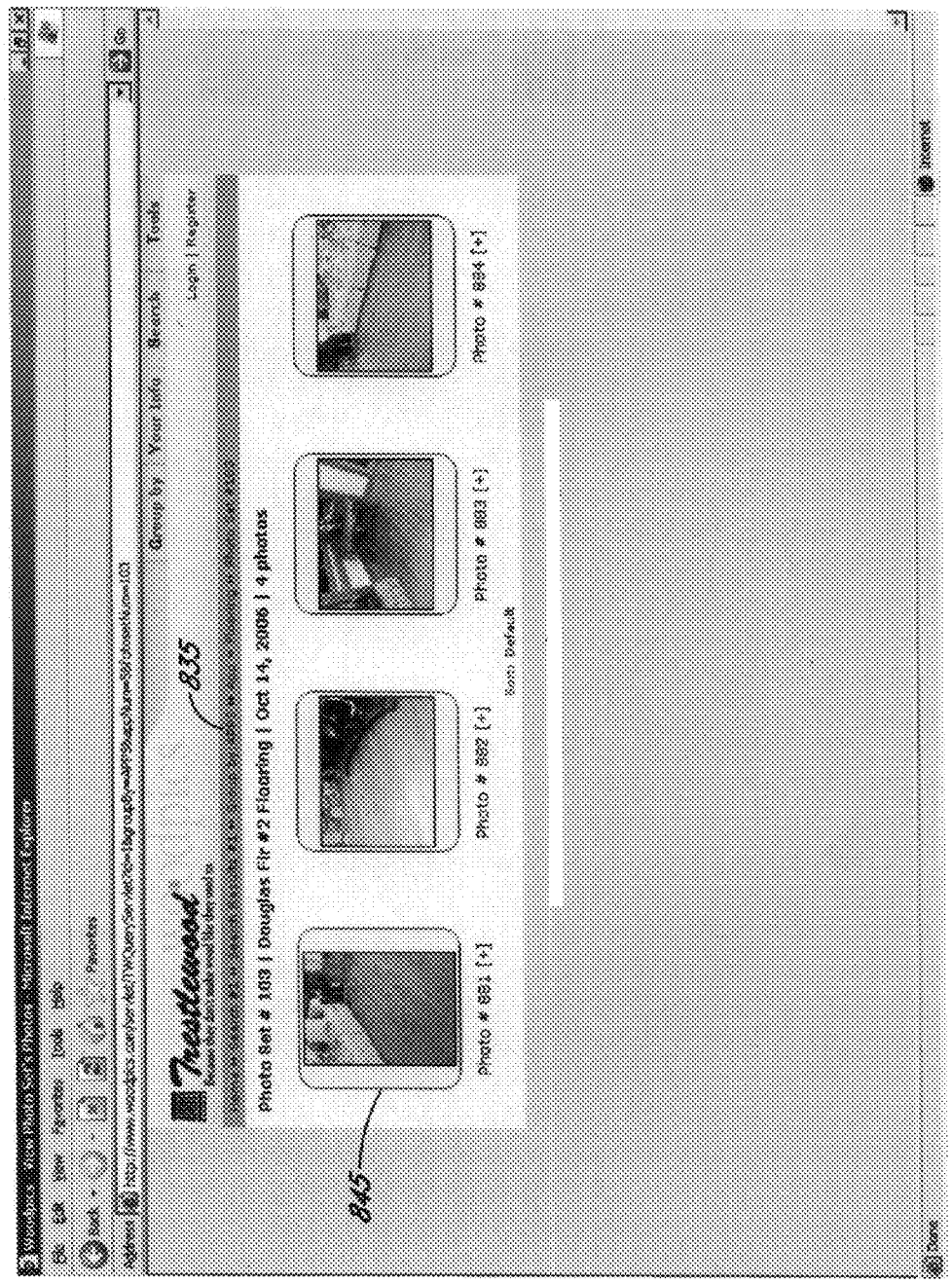

FIG. 8G illustrates a photobase screen after a user selects a specific photoset. Specifically, in FIG. 8G, the photobase screen 800 shows the 4 photos in the "Douglas Fir #2 Flooring" photoset of FIG. 8F. Individual photo information 845 is shown. A user may click on an individual photo to view a large image of the photo or may choose to view additional information about a particular photo. As illustrated, the search history 835 is updated to show the entire search history from an overall data set to a data set that is narrowed to the 4 photos of the "Douglas Fir #2 Flooring" photoset.

Figure 8H:
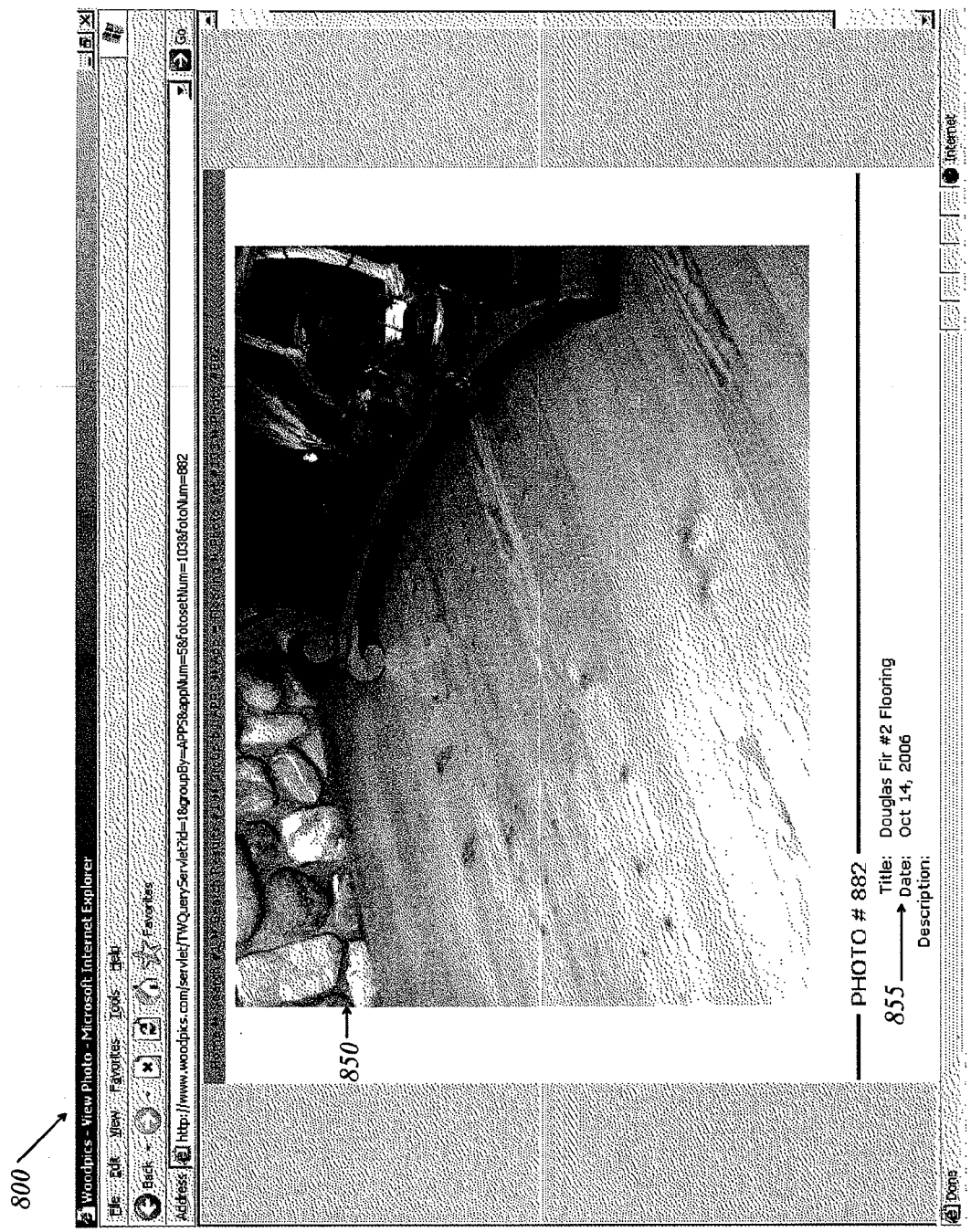

FIG. 8H illustrates a photobase screen that displays a large image of a single photo that has been selected by a user. Specifically, the screen 800 includes a large photo image 850 and a photo description 855.

Figure 8I:
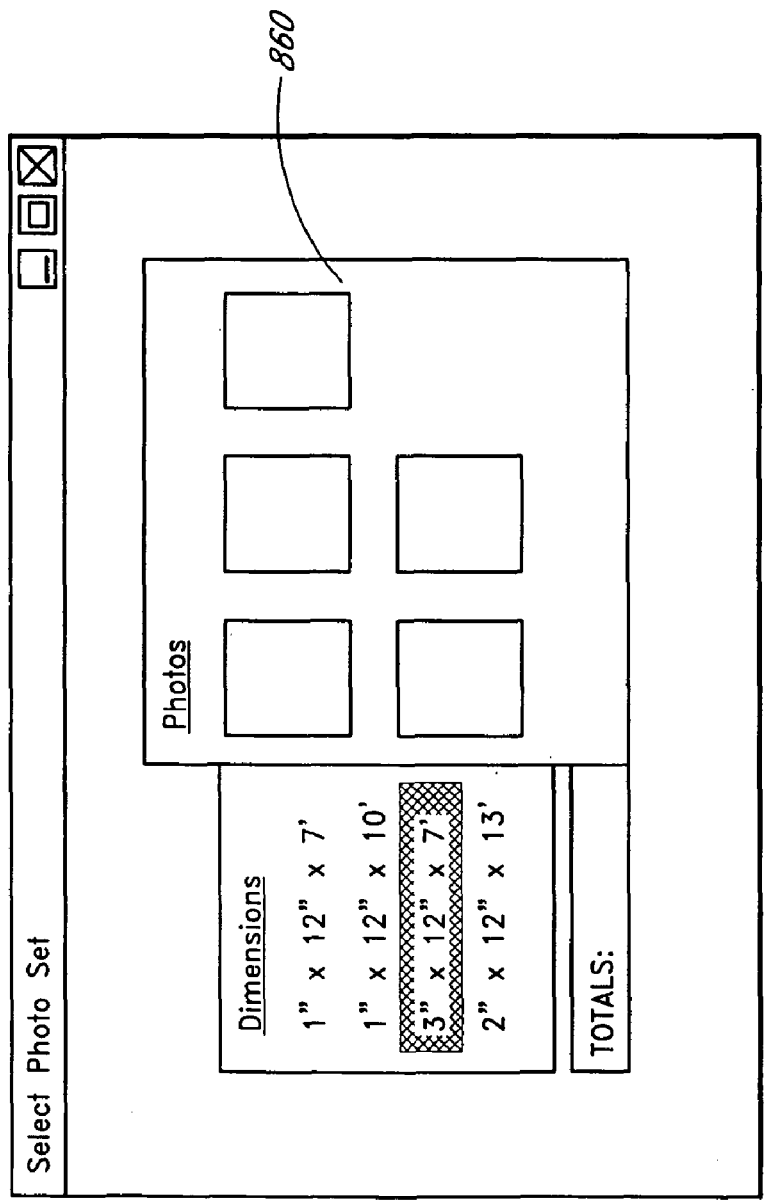

We have described two specific applications of the apply search criteria operation 104, the grouping operation 108, and the narrowing operation 112. Specifically, these operations may be used to enhance searching in an inventory system or in a photobase. The operations, features, and characteristics set forth herein are not limited to these specific applications, however. Further, while we have described the inventory system and the photobase system separately, these applications can be combined. For example, the inventory system, as described, may present textual information about pieces of wood. A user of the inventory system may use the features described herein to focus a search based on the textual information provided for the pieces of wood. The system may also allow the user, however, to choose particular records and to view any photos that may relate to those records. FIG. 8I illustrates such a scenario. In FIG. 8I, the user has selected an option to view photos that relate to pieces of wood with dimensions of 3 inches by 12 inches by 7 feet. The system has presented to the user a photo viewing window 860 that displays the related photos. In one embodiment, the system provides one, some or all of the photo search capabilities described above.

Data Display Options, Administration, Electronic Commerce, and Other Tools

We have described embodiments of systems and methods for searching one or more data sets that can be used generally with any application that accesses data sets. As used in this section, the term "searching" refers generally to the process of finding information in one or more data sets and includes many operations such as browsing for information, searching by criteria, performing narrowing operations, performing grouping operations, and the like. In various embodiments, the systems and methods are implemented in larger systems that include many other features as well. In this section, we describe only some of the features that can be used along with the systems and methods described above. It will be appreciated that these features can be implemented for the practical applications set forth above (i.e. the inventory database system and the photobase) and can be implemented with any other application that uses the systems and methods described herein.

In one embodiment, a sophisticated permissions system provides significant control over which users are given access to which capabilities. For example, one variant of the permissions system allows a system administrator to assign access rights to any user. Registered users may have more access rights than unregistered users, and registered users may differ individually in their access rights. For example, in one embodiment, registered users who have logged in are presented with additional search options, group by options, or other options that are not presented to unregistered users or to registered users who have not logged in.

In one embodiment, users may be allowed to email links to data items found while searching through one or more data sets. With respect to the photobase application, for example, users may be able to email links to photos or photosets. Alternatively, users may be able to email copies of data items, rather than links. Alternatively, users may be able to email both copies and links, or either depending on each user's choice.

In one embodiment, an automated process may create clickable links to searches performed by the user or to related searches. The clickable links to searches that have been performed may be useful to the user to quickly navigate among previously performed search results. The automated process may generate the related searches by, for example, predicting one or more searches that a user may want to perform based on previously performed searches, statistical analysis of searches performed by other users, and the like. Advantageously, clickable searches allow a user to invoke a search simply by clicking or otherwise invoking a hyperlink or other mechanism.

As set forth above, embodiments of the systems and methods described herein involve a large amount of data. Often, the large amount of data may be presented using multiple columns or rows that display multiple fields of data for each data item. Preferably, the system provides tools that allow the user to manipulate the way in which the user views the data. Some tools that may be provided but are not required follow.

In one embodiment, the system provides tools to let the user influence the type and amount of data that is displayed for each data item. For example, a user may be able to specify whether only data thumbnails or detailed data is displayed for each item. The user may be able to individually specify the fields that are displayed with a given report. The user may be able to choose the order in which data items are displayed. For example, in one embodiment, the user can sort by any of the fields displayed on a screen, either in ascending or descending order. The user may be able to store default display preferences that are specific to that user and that the system uses, by default, when the user is using the system. Preferably, the system allows the user to override such defaults.

In one embodiment, the system allows the user to export data sets to "temporary lists" that can be independently accessed and manipulated, without changing the underlying data of the system. For example, in a sales information system, a salesman could export a temporary list of past sales information to his laptop computer, take the information with him on the road, and analyze the past sales information during a trip. This may allow the salesman to understand sales patterns or trends that may help him improve his future sales performance. In the context of analyzing data in a temporary list, the system may also include data analysis tools that facilitate the detailed comparison of two or more temporary lists.

A skilled artisan will appreciate, in light of this disclosure, that the exportation of temporary lists preferably includes some mechanism for ensuring data consistency and integrity if the user is allowed to modify the data. For example, in some embodiments, the user is allowed to modify the data on a temporary list, then import the modified data back into the system, only if there is an access control mechanism (such as check-in and check-out) that prevents two people from simultaneously modifying the data.

In one embodiment, the system includes tools to display additional information about selected data. For example, the system may include tools for displaying detailed statistical information about currently displayed or currently selected data. The detailed statistical data may include, for example, information about how selected data relates to the working data set, other levels, other groups, and the like.

In one embodiment, the system allows the user to dynamically enter information about displayed data and use the dynamically-entered data in subsequent operations. For example, in one embodiment, the user may be allowed to enter data rankings for specific line items. The user could then perform searches, groupings, or narrowings based on these rankings. Alternatively or additionally, the user could sort data items according to their rankings. Preferably, such dynamically-entered data may be user-specific, such that one user could take advantage of his own entries without having those entries affect other users. In this way, the system provides a powerful tool for each user to make virtual "annotations" on data items that help the user organize data without altering the manner in which other users view the data. In one embodiment, dynamically-entered data may be made available to other users. It can be advantageous to share dynamically-entered data in a collaborative environment in which multiple users are collaborating to analyze data.

The foregoing paragraph refers to users' ability to dynamically enter information about data without changing the underlying data. Alternatively or additionally, the system may allow users to dynamically change the underlying data itself. That is, the system may allow the user, upon selecting a data item, to directly access the data item and enter changes to the item. This can be advantageous in scenarios where the user notices an error in the displayed information, or when the information needs to be updated, such as in an inventory system when the displayed information relates to inventory items that have just been sold and are no longer part of inventory. In the latter example, the user can directly access the data items related to the recently-sold items and enter a purchase record that causes the system to take the data items out of inventory. A skilled artisan will appreciate, in light of this disclosure, that dynamic change to underlying data can be powerful but can, without proper safeguards, result in loss of data integrity. Accordingly, the system preferably includes safeguards to prevent or at least reduce the chances of malicious or negligent changes to data items.

In one embodiment, the system may automatically detect circumstances in which additional apply search criteria 104, grouping 108, and narrowing 112 operations may be performed in order to simplify a data set or display a data set in a manner that may be easier to understand. For example, in one embodiment, the system may automatically detect that a particular grouping operation would result in a data set that is simple and easy to understand. Such a scenario may occur, for example, when the present data set may be fully classified into just a few groups, such as, for example, 4 groups, that are deemed by the system to be analytically useful groups. Thus, if previous operations have restricted the data set to include pieces of lumber that can be classified into 4 widths, of 6 inches, 12 inches, 18 inches, and 24 inches, then the system may automatically perform a grouping operation 108 in order to display those 4 groups to the user. Preferably, the system informs the user that such an operation has occurred or will occur in order to prevent confusion. Preferably, the system performs such automatic operations as a default but allows the user to override this default. Alternatively, the system may perform such automatic operations only when the user has enabled them. Preferably, the system allows the user to enable specific types of automatic operations while not enabling other types.

In one embodiment, the system includes a number of forms that allow a user to enter information or request information. For example, one form may be a registration form that allows the user to register with the system. The registration process may include requesting a user name and password that the user may use to access the system in the future. Other forms may include a catalog request form or a feedback form.

In one embodiment, the system includes administrative tools for managing user accounts, modifying data set records, updating databases, and the like. In one embodiment, the system includes archive tools for archiving data sets. With respect to the photobase application, the system may include utilities for adding or modifying photosets or photos, or for managing a photoset entry or review process.

In one embodiment, the system is integrated with electronic commerce capabilities. For example, the inventory database application may include order forms, checkout forms, payment processing capabilities, electronic shopping cart capabilities, and other features of an electronic commerce network site. In one embodiment, an inventory system may be integrated with a shipping system such that ordered inventory may be removed from a data set or marked as sold and a shipping center notified that an order has been placed that needs to be filled.

In one embodiment, the system includes tools that allow users or automated processes to create, save, and share links to searches, groups, photos, photosets, or anything else. Such links may be represented, in one format, as a hyperlink. Such a hyperlink may be shared by transmission via email, by embedding in a user-accessible website, or the like.

In one embodiment, the system is integrated with discussion groups, threads, communities, and the like. For example, in the context of the photobase application, a discussion group may exist for each photoset. Users may access the photoset to view photos and may also enter thoughts about the photos in a discussion group dedicated to that photoset. Discussion groups, threads, communities, and the like can be dedicated to other data items, not just photosets, or they can be created by a user and associated with a photoset or other data item.

In one embodiment, the system is integrated with a calendaring system, a to-do system, a contact management system, or any similar system for time management, organization, or the like. In one embodiment, the system is integrated with content such as Associated Press articles, Real Simple Syndication feeds, blog entries, linked websites, or the like. In one embodiment, users have at least some control over such content such that they may, for example, choose which types of content are linked with the system.

Software Implementation

As set forth above, the systems and methods described herein can be implemented in computer software. As such, any of the components, modules, or process steps described herein can be encoded on a computer-readable medium as a plurality of computer-executable instructions that are configured, when executed by a computer, to perform the functions described herein. As such, each of the processes described herein can be performed by a computer that executes the computer-executable instructions necessary to perform the process. As set forth above, each of the components, modules, or process steps described herein can also be implemented in firmware, hardware, or some combination of software, firmware, and hardware. The manner of making and using each of these variants will be apparent to a skilled artisan in light of this disclosure.

Alternative Embodiments

Some example embodiments have been described by way of example and not limitation. The invention is not limited to the example embodiments described herein. Rather, the invention encompasses the disclosed embodiments and any other embodiments that would be appreciated by a skilled artisan in light of this disclosure.

We claim:

1. A query system comprising:
an inventory database, stored in an at least one computer-readable medium, that stores a plurality of data items, wherein each data item stores information about a physical product that is in an inventory of products available for sale, each data item is associated with categorization information related to characteristics of the physical product, and the categorization information allows division of the data items into groups based on at least one categorization selected from at least 8 categorizations that are pre-defined prior to execution of a search operation;

computer hardware comprising at least one computer processor configured to access and to execute computer-executable instructions, thereby causing the computer hardware to perform operations defined by the computer-executable instructions; and a plurality of components configured to allow users to navigate among the data items in order to obtain information about physical products in the inventory of products available for sale, wherein each of the components is stored in at least one computer-readable medium accessible to the computer hardware, wherein each component comprises computer-executable instructions that define operations to be performed by the computer hardware when executed by the computer processor, and wherein the plurality of components comprise:

a search component configured to apply search criteria to a search input data set comprising at least some of the data items stored in the database and to generate a search output data set comprising data items that meet the search criteria; thereby assisting a user to access information about physical products that is stored in the data items included in the search output data set;

a grouping component configured to receive a user selection of at least one categorization, to divide a grouping input data set comprising at least some of the data items stored in the database into a plurality of grouping output data sets in accordance with the selected categorization by assigning each data item of the grouping input data set to one of the grouping output data sets based on the categorization information associated with the data item, wherein each of the grouping output data sets comprises at least one data item belonging to the grouping input data set, and to display information about the grouping output data sets, thereby assisting a user to organize information about physical products in inventory according to characteristics of the physical products;

a narrowing component configured to receive a selection of one or more narrowing input data sets and to generate a narrowing output data set comprising data items belonging to the one or more selected narrowing input data sets, thereby assisting a user to focus a search for information about physical products in inventory, wherein the output data sets of the searching component, the grouping component, and the narrowing component are configured to be acceptable input data sets for at least the grouping component and the narrowing component such that at least the grouping component and the narrowing component can be invoked iteratively to further group or narrow one or more output data sets generated by the search component, the grouping component, or the narrowing component, and wherein a later invocation of the grouping component allows user selection of a different categorization than was selected in an earlier invocation of the grouping component; and a data entry component that allows a user to dynamically enter additional information about displayed data, wherein the dynamically entered additional information is used by the system in subsequent operations, wherein the additional information is either user-specific or shared, and wherein additional information that is user-specific is accessible to a user that entered the information but not accessible to other users and additional information that is shared is accessible to at least one other user.

2. The query system of claim 1, wherein the grouping component is further configured to display aggregated information about the grouping output data sets when at least one of the grouping output data sets comprises more than one data item.

3. The query system of claim 1, wherein the one or more narrowing input data sets for which the narrowing component receives a selection are selected from the grouping output data sets.

4. The query system of claim 1, wherein the grouping component is further configured, upon receiving a selection of more than one categorization, to divide the grouping input data set into the grouping output data sets in accordance with all of the selected categorizations.

5. The query system of claim 4, wherein the grouping component is further configured to allow a user to select a two-level grouping operation in which data items are divided in a first level categorization and the data items within each group of the first level categorization are further divided in a second level categorization.

6. The query system of claim 1, wherein the query system is further configured to receive user-entered content, to store at least some of the user-entered content in the database as categorization information associated with a data item, and to allow selection of a categorization that is based, at least in part, on the user-entered content.

7. The query system of claim 5, wherein the query system is further configured to receive user-entered content, to store at least some of the user-entered content in the database as categorization information associated with a data item, and to allow selection of a categorization that is based, at least in part, on the user-entered content.

8. The query system of claim 7, wherein the grouping component is further configured to operate on multiple grouping input data sets by combining the multiple grouping input data sets into a single data set and performing the grouping operation on the single data set.

* * * * *

UNITED STATES PATENT AND TRADEMARK OFFICE
CERTIFICATE OF CORRECTION

| | |
|---|---|
| PATENT NO. | : 7,917,511 B2 |
| APPLICATION NO. | : 11/650119 |
| DATED | : March 29, 2011 |
| INVENTOR(S) | : John S. Cannon and Shashidhar Rampally |

It is certified that error appears in the above-identified patent and that said Letters Patent is hereby corrected as shown below:

In Column 28, Line 31, Please delete "discemable" and replace with --discernable--.

In Column 30, Line 38, Please delete "that'is" and replace with --that is--.

In Column 36, Line 13, Please delete "users'ability" and replace with --users' ability--.

Signed and Sealed this
Twentieth Day of September, 2011

David J. Kappos
*Director of the United States Patent and Trademark Office*